(12) United States Patent
Weingarten et al.

(10) Patent No.: US 10,074,032 B2
(45) Date of Patent: Sep. 11, 2018

(54) USING IMAGES AND IMAGE METADATA TO LOCATE RESOURCES

(71) Applicant: ShopTAP, Inc., San Francisco, CA (US)

(72) Inventors: Tim Weingarten, San Francisco, CA (US); Simon Peck, San Francisco, CA (US); Dan Linsky, San Francisco, CA (US)

(73) Assignee: Style Hunter LLC, Miami Beach, FL (US)

( * ) Notice: Subject to any disclaimer, the term of this patent is extended or adjusted under 35 U.S.C. 154(b) by 499 days.

(21) Appl. No.: 14/860,666

(22) Filed: Sep. 21, 2015

(65) Prior Publication Data

US 2016/0085865 A1 Mar. 24, 2016

Related U.S. Application Data

(60) Provisional application No. 62/053,037, filed on Sep. 19, 2014.

(51) Int. Cl.
*G06F 17/30* (2006.01)
*G06K 9/62* (2006.01)

(52) U.S. Cl.
CPC ..... *G06K 9/6202* (2013.01); *G06F 17/30265* (2013.01); *G06F 17/30277* (2013.01); *G06F 17/30911* (2013.01)

(58) Field of Classification Search
CPC ............ G06K 9/6202; G06F 17/30277; G06F 17/30911; G06F 17/30265
See application file for complete search history.

(56) References Cited

U.S. PATENT DOCUMENTS

| 7,752,195 B1* | 7/2010 | Hohwald | .......... G06F 17/30312 707/715 |
| 2015/0254751 A1* | 9/2015 | Torres | ................ G06Q 30/0625 705/26.62 |

* cited by examiner

*Primary Examiner* — Alexander Khong
(74) *Attorney, Agent, or Firm* — Jefferson IP Law, LLP

(57) ABSTRACT

A method of using images and image metadata to locate one or more resources includes receiving a requests, each request requesting a location of a resource and including an image related to the resource, information specifying how the image and the resource are related, and metadata for the image. A queue is created for each of a plurality of responding systems, the queue ranked, and specifying the order in which the requests are to be displayed at respective responding systems. The generated queues and sent to their respective responding systems, and a response is received that specifies the location of a resource.

20 Claims, 21 Drawing Sheets

USING IMAGES AND IMAGE METADATA TO LOCATE RESOURCES

CROSS-REFERENCES TO RELATED APPLICATIONS

This application claims priority to U.S. Provisional Patent Application No. 62/053,037, filed on Sep. 19, 2014, the disclosure of which is hereby incorporated by reference in its entirety for all purposes.

FIELD

The present disclosure generally relates to data processing systems, and more specifically, to determining the location of resources in a networked system.

BACKGROUND

Conventional approaches to locating resources involve the use of search engines which search based on keywords, or manual navigation of websites by a user, looking for resources of interest. So-called "visual search engines" exist, but are limited to seeking images that look like other images, and are focused on the exact content of an image used for searching. In some cases a user may be expressly looking for something not in a picture, and conventional approaches lack the flexibility and reach to get good results in these circumstances.

What is needed is a better way to locate resources.

BRIEF SUMMARY

Embodiments of the present invention provide a method, system and computer product for using images and image metadata to locate one or more resources includes receiving a requests, each request requesting a location of a resource and including an image related to the resource, information specifying how the image and the resource are related, and metadata for the image. A queue is created for each of a plurality of responding systems, the queue ranked, and specifying the order in which the requests are to be displayed at respective responding systems. The generated queues and sent to their respective responding systems, and a response is received that specifies the location of a resource.

A better understanding of the nature and advantages of embodiments of the present invention may be gained with reference to the following detailed description and the accompanying drawings.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

I. Overview

Figure 1A:
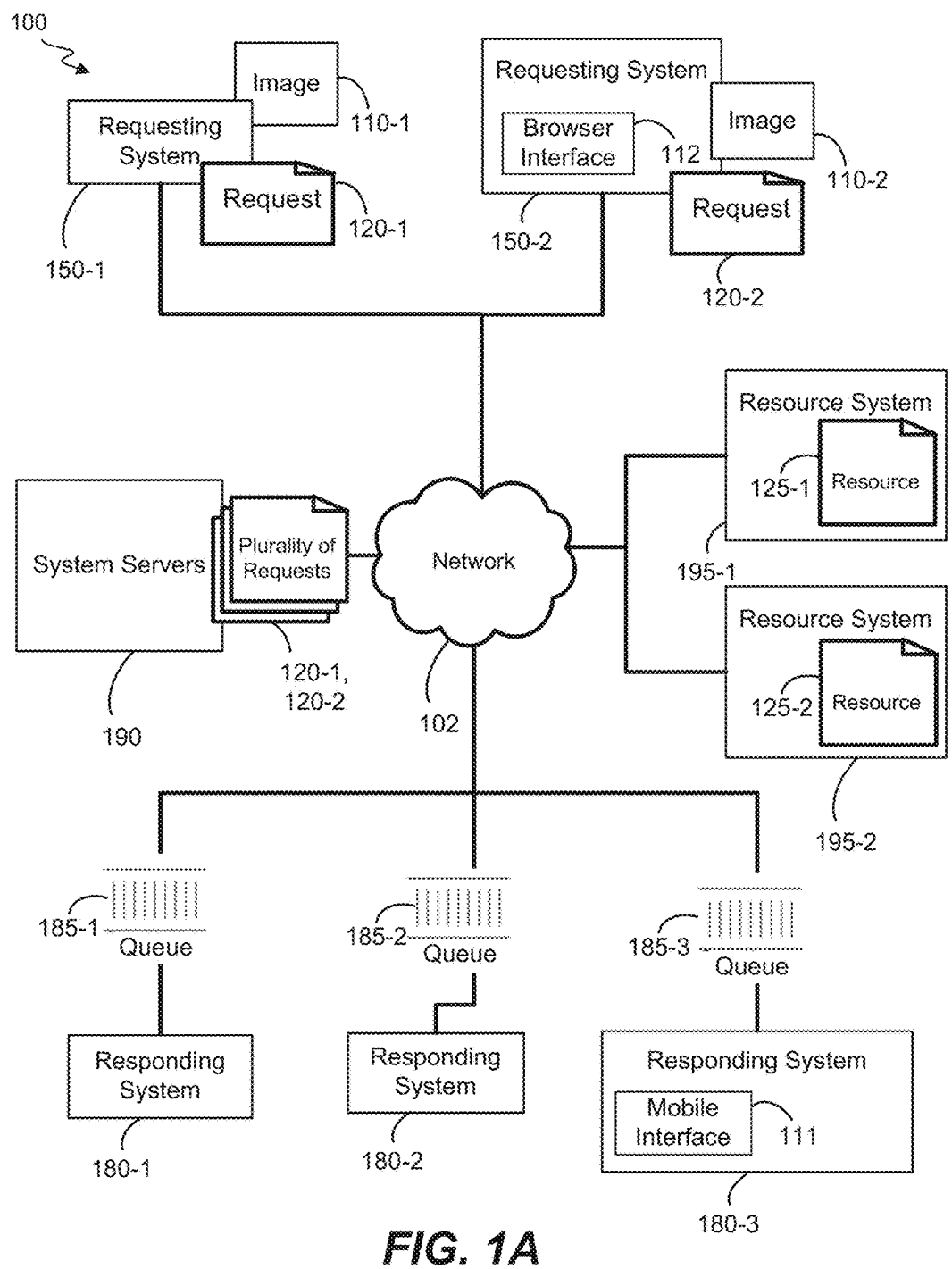
FIG. 1A illustrates a high-level block diagram of a system for using images and image metadata to locate resources, according to an embodiment.

FIG. 1A illustrates a high-level block diagram of a system 100 for using images 305 and image metadata to locate resources, according to an embodiment. FIG. 1 depicts system servers 190 connected to requesting systems 150 via a network interface coupled to network 102, responding systems 180 and resource systems 195. Additional details about system servers 190 can be found at FIGS. 19A-19B, and accompanying discussion below (the term "server" is used herein to signify a computer server implemented using one or more computer apparatuses). In some embodiments, requesting systems 150 generate requests 120 for the locations of resources 125 (also termed herein as "requests" or "Hunts") using a combination of structured and unstructured data.

As discussed further with the descriptions of FIGS. 2-19 below, the unstructured components of request 120 can include a digital image 110 (also termed an "image" herein), and narrative search information to limit or expand the scope of request 120. Structured data included in request 120 can include, but are not limited to, information describing a relationship between the image and the resources 125 sought by some embodiments.

Once a plurality of requests 120 reach system servers 190, to receive responses (also termed herein "solutions" or "finds") to requests 120, some embodiments generate multiple complex data structures (e.g., queues 185) to hold pending requests. Some embodiments, to improve the handling of requests 120 by responding systems 180, generate one or more queues 185 for selected responding systems 180. At responding systems 180, some embodiments use queues 185 to structure the processing and/or display of requests, along with their associated images, structured and unstructured terms. Creating queues by some embodiments is discussed with reference to FIG. 13 below.

Some embodiments (e.g., requesting systems 150 and responding systems 180) use one or more user interfaces to create, manage, and respond to requests 120. The user interfaces may be a web application, a mobile application, or a mobile web application. The web application may be accessed via one or more browser interfaces 113, and the mobile application and mobile web application may be accessed via one or more mobile interfaces 111. The web, mobile, and mobile web applications may be accessed on a variety of electronic web-enabled devices, including but not limited to a mobile device, tablet, laptop, and desktop computer. The user interface(s) of each of the above-described applications may be optimized in different ways for viewing and navigation depending on the type of device it is displayed on.

It should be noted that, in some embodiments, requesting system 150 and responding system 180 can be operated on the same device, e.g., a request 120 can be generated, then a queue 185 can be received by the same computer or mobile device. In some embodiments, requests can be generated by a requester (also termed herein a "poster" and/or an "original poster").

Figure 1B:
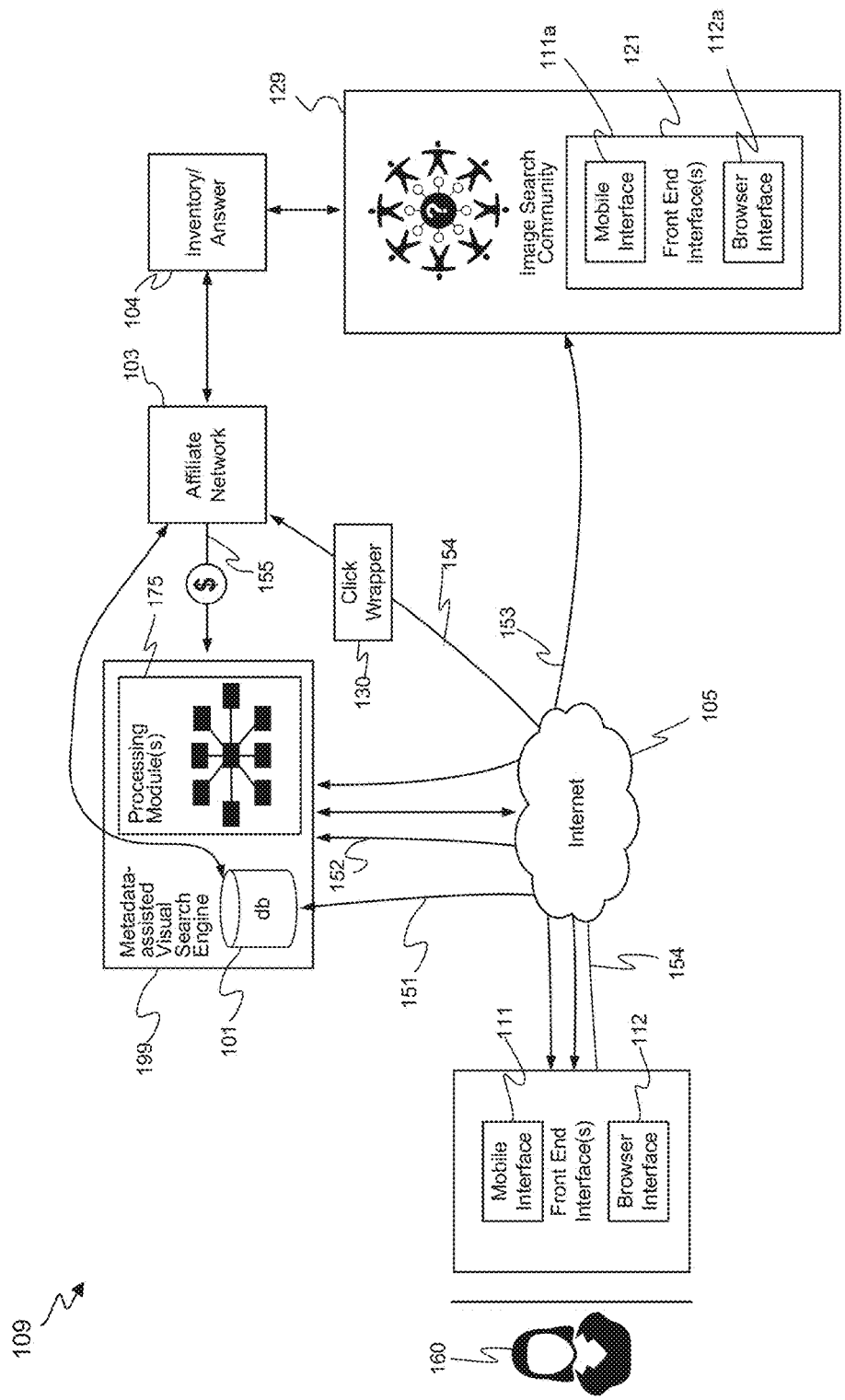
FIG. 1B illustrates a high-level block diagram of another embodiment of a system for using images and image metadata to locate resources.

FIG. 1B is a schematic diagram of the architecture that enables users who are original posters 160 (termed as— "requesters," or "posters" herein) who search for resources (e.g., articles of clothing, jewelry) may use a user interface on a requesting system (e.g., browser interface 113 on requesting system 112) to generate requests for the location of particular resources. In this example embodiment (and elsewhere herein), generating a request can be termed "posting a Hunt," and users who use responding systems 180 to respond to requests—the image search community 129, termed to be "solving a Hunt"—may use user front end interface(s) 121. In the Hunt example embodiment, system servers 190 can be termed to be a metadata-assisted visual search engine 199.

In the Hunt example, in some embodiments of user interfaces 111 and 121 may be used to input data to send to a database 101 and also to receive data from the database 101, which is part of a metadata-assisted visual search engine 199. The metadata-assisted visual search engine 199 receives, analyzes, and sends data to optimize the speed, accuracy, and quality of search results; certain processing modules 175 may be used to carry out one or more of these tasks.

In some embodiments, solutions that result in the purchase of the resources located may be tracked. This may be done by wrapping the URL associated with a link presented to users such that when users click the link, they are redirected at 154 through a tracking service 130 to an affiliate network 103 (e.g. linked to a retail website), and any purchases 104 that directly follow may cause vendor data verifying the purchase at 155 to be received by the system. An automatic payment (e.g. a percentage of the payment for a user purchase 104 from a retailer) may be linked to the purchase verification at 155 that occurs from a click on the wrapped URL. In some embodiments, benefits can accrue to system users for their submissions (e.g., requests and responses) that result in some sale occurring.

Figure 2:
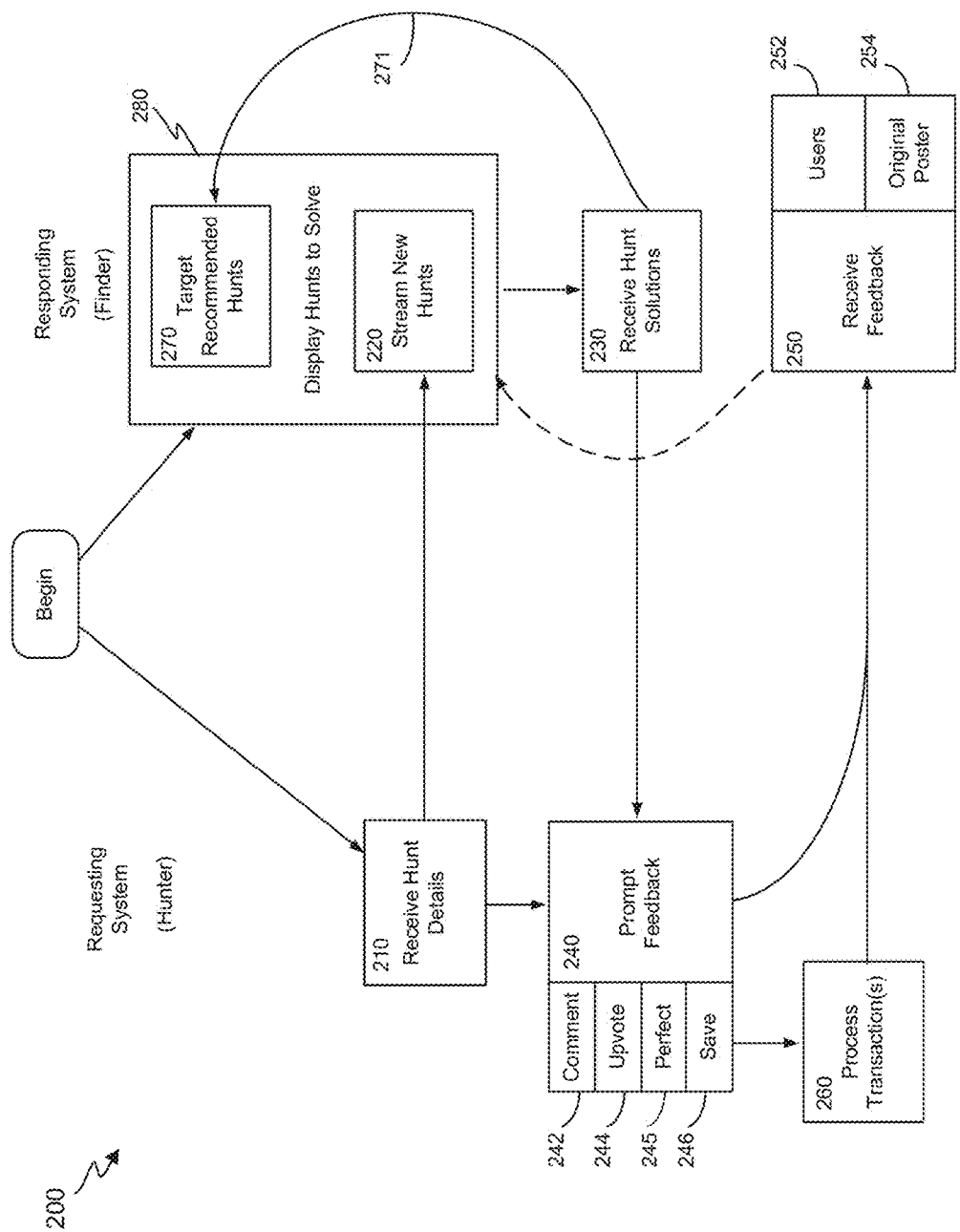
FIG. 2 is a flow diagram of a system for using images and image metadata to locate resources, according to an embodiment.

FIG. 2 is a flow diagram 200 of a system for using images and image metadata to locate resources, according to an embodiment. Some embodiments use one or more user interfaces to create, manage, and respond to requests 120. The user interfaces may be a web application, a mobile application, or a mobile web application. The web application may be accessed via one or more browser interfaces 113, and the mobile application and mobile web application may be accessed via one or more mobile interfaces 111. The web, mobile, and mobile web applications may be accessed on a variety of electronic web-enabled devices, including but not limited to a mobile device, tablet, laptop, and desktop computer. The user interface(s) of each of the above-described applications may be optimized in different ways for viewing and navigation depending on the type of device on which it is displayed.

Details for a Hunt are received at 210. These details may be displayed in a feed of Hunts at 220. In some embodiments, one or more solutions to the Hunt may be received at 230 (e.g., from Feedback 240 in response to the Hunt and/or solutions may be prompted for). The feedback may include, for example, comments 242, upvotes 244, being marked "perfect 245" (e.g., marking a Hunt solution as the best or an acceptable answer), and/or saves 246. A more detailed discussion of feedback within some embodiments is found with the discussion of FIG. 18 below.

The solutions that are submitted may also be used at 271 to optimize the display of recommended Hunts 270 for users. Transactions related to submitted solutions may be processed at 260. Feedback on the Hunt and/or solutions may be received at 250, and may be displayed in the feed of Hunts at 220. The feedback may be submitted by users at 252 or by the original poster of the Hunt at 254. It should be noted that, in some embodiments, the interaction of requestors and responders can yield location results that include Internet links to attain resources sought, as well as other information, including information about other resources.

II. Generating Requests/Hunts

Figure 3:
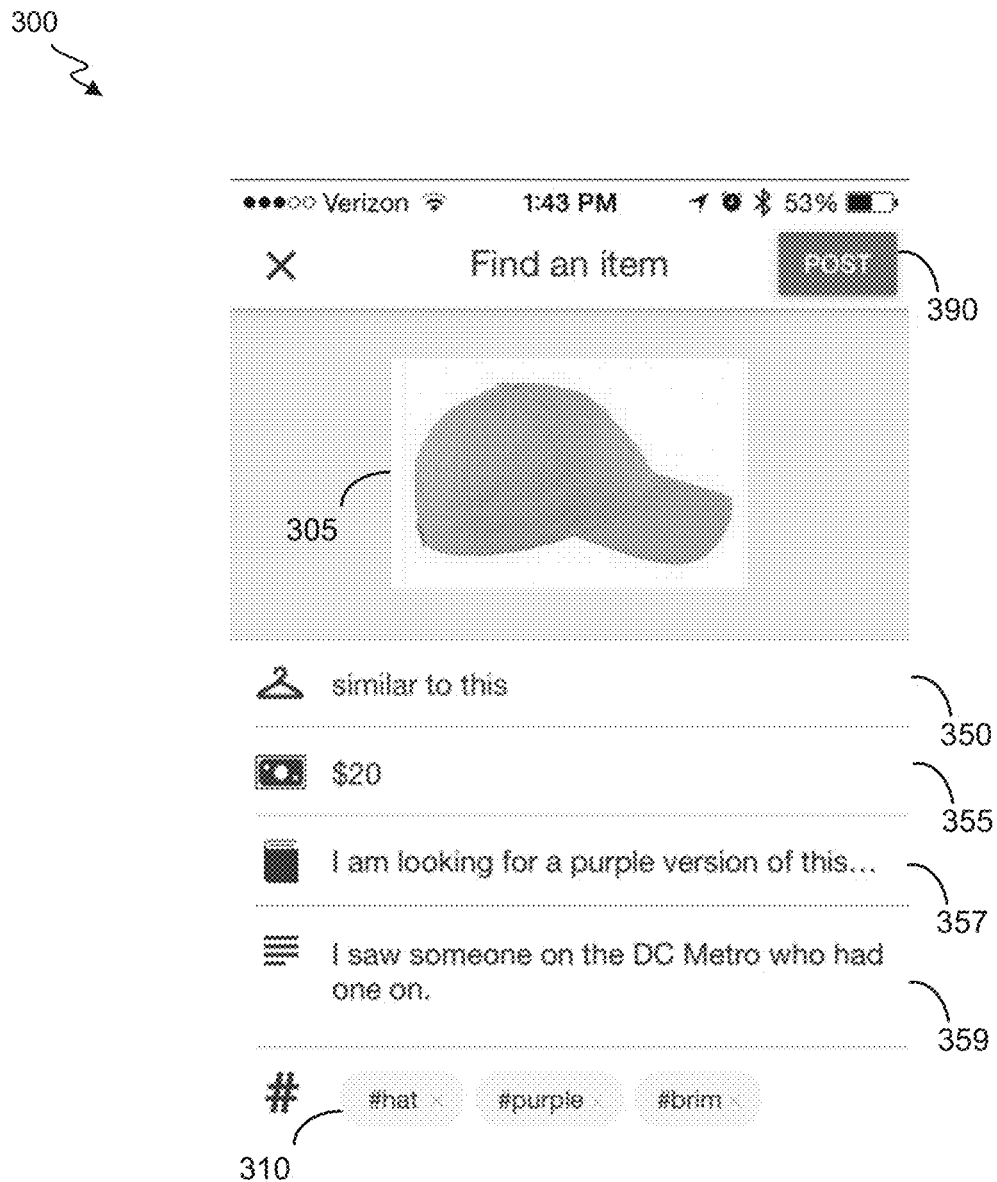
FIG. 3 is a screen capture of a user interface for requesting the location of a resource, according to an embodiment.

FIG. 3 is a screen capture of a user interface 300 for requesting the location of a resource, according to an embodiment. It should be noted that, while some screen captures shown in figures included herewith are associated with the example Hunt embodiment, the principles discussed can, in many instances, be applied to other embodiments as well. In some embodiments, triggering the display of the "Find an Item" interface form, as shown in FIG. 3, is one way to generate a request.

In some embodiments, different combinations of request data (e.g., 305, 350, 355, 357, 359 and 310) specify attributes of an item for which the poster is searching. The data can be text, images, tags, links, etc. In some embodiments, image 305 provides a focal point around which other request data is organized (e.g., in 357: "I am looking for a purple version of this hat" and relationship 350 (a structured entry): "similar to this [picture]").

Some embodiments can flexibly allow a requester to attach, link to, or generate image 305. For example, the poster can upload an image 305 or a link to an image 305 on a network (e.g., the Internet). In some embodiments, the image that is uploaded may be selected from an image library housed on the user's mobile device, tablet, computer, etc., and/or image 305 may be captured by a camera within a mobile device. While a single image 305 is shown in FIG. 3, and elsewhere herein, it should be noted that more than one image can be included with request 120. Also, while images 305 are depicted in examples discussed herein, some embodiments can use combinations of other types of multimedia as well, e.g., video and/or audio-only multimedia.

To give visual context to a Hunt, the original poster 160 may submit a website URL that points to a certain image file or other destination. In some embodiments, the inclusion of images allows a request to be focused a broad variety of different subjects. Examples include, but are not limited to: pictures taken by a requester of themselves wearing a similar product (e.g., "selfies" as shown in FIG. 9), a professionally shot image of a model wearing a product (e.g., FIG. 5), a non-professional picture from another social media site showing the product as just one small portion of the picture (e.g., FIG. 8).

In some embodiments, relationship 350 enables a requester to specify a relationship between the sought after resource and the included image(s). In some embodiments, relationship 350 is a structured entry that can provide embodiments with an efficient classification mechanism.

As noted above, a type of Hunt (e.g., relationship 350) may be specified by the original poster 160. Certain embodiments may present one or more Hunt types to the original poster 160 for selection, so that the Hunt may later be categorized and viewed by type. Examples of relationship 350 types used by certain embodiments include, but are not limited to: This Exactly"—This type is for requests for an exact item, e.g., the structured equivalent of: "Where can I find a shirt exactly like the one shown in the attached photograph?"; "Similar to this"—This type is for requests for resources similar to attached image 305, e.g., the structured equivalent of: "Where can I find a shirt similar to the one shown in the attached photograph"; "What goes with this"—Hunt for a complimentary item, e.g. "Where can I buy a tie that goes with this shirt?" "Style me"—In some embodiments, this relationship-type can broaden a resource request to also be based on details of the requester—this type of relationship being described further with the description of FIG. 9 below. In the last two examples, it should be noted that, the requester is specifically searching for something that is not in the provided image.

One having skill in the relevant art(s), given the description herein, will appreciate additional types of relationships 350 that can augment the use of image 305 as a visual search term by some embodiments. Examples of requests from each of the relationship types above are shown and discussed with FIGS. 5-10 below.

Request data shown in FIG. 3 also includes an entry block for budget 355. In some embodiments, this budget 355 search value can be included to allow for a request to be limited to items that can be obtained under a maximum value. In the example shown in FIG. 3, the search for a resource similar to the one depicted in image 305 is further limited to a resource that can be obtained for less that the budget 355 entry, e.g., $20. In some embodiments, this field can be used as an advisory value, not limiting the inclusion of search results (e.g., a link provided by a response system is over $20, but it is not filtered from a result set), in some embodiments, budget 355 can be applied as a filter to limit results shown to a requester. It should be appreciated that different settings described in embodiments herein can be set automatically by the system and/or can be selected as configuration options by requesting systems and/or responding systems.

Figure 11:
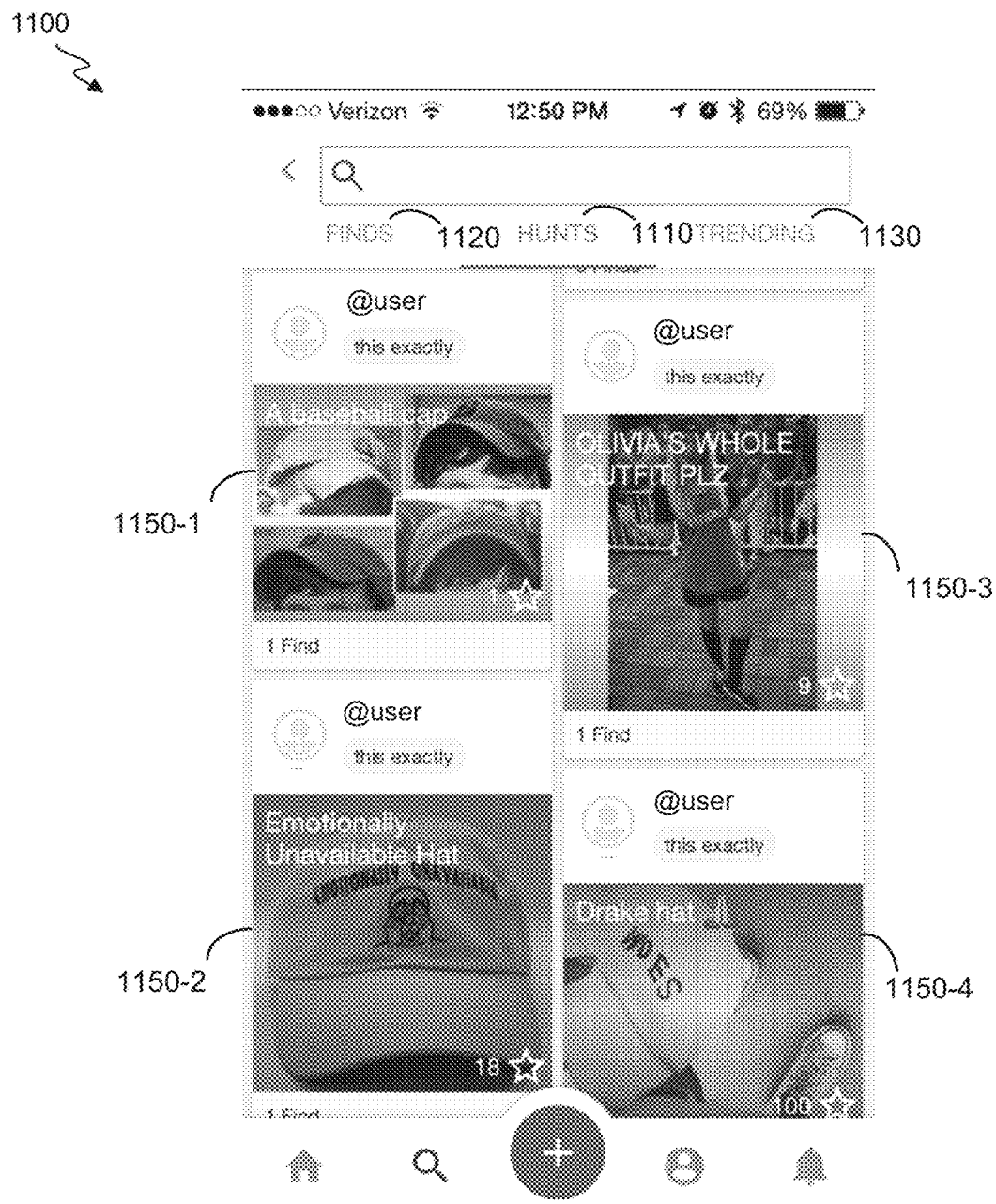
FIG. 11 is a screen capture of a user interface displaying resource requests from a ranked queue of resource requests, according to an embodiment.

In some embodiments, a tags 310 section is included, and enables the use of keyword-type metadata (e.g., about image 305 and/or about the request generally), this metadata (also termed "tags" herein) providing additional structured information for handling requests 120 (see the discussion of FIG. 11, for examples). For example, one or more tags can correspond to the item sought by a Hunt. Each tag is a keyword or keyphrase can be used for identifying entries associated with the keyword or keyphrase. In some embodiments, tags 310 can be already attached to image 305 (e.g., added by system processes that can automatically determine the contents of images) and/or can be added during the creation of a request for a resource (e.g., see the discussion of FIG. 5 below).

In some embodiments, request data may also include, but is not limited to, a request title, request description 357, size, shipping location, outfit vs. single item, item type, number of items, occasion and/or any other descriptive information relevant to resource selection. This unstructured supplemental information can provide additional focus and context for the search request. Examples of unstructured, narrative request data include:

"Please recommend a dark brown blazer that I can wear to work and out on the town, and comes in an extra-long length."

"I would like to know where I can buy the shirt featured in the attached photograph."

"I would like to know where I can buy a shirt similar to the one featured at the linked website, but has a v-neck instead of a collar."

"Please recommend one or more outfits similar in style to the luxury line shown in the attached photograph, and which I can find at discounted prices In some embodiments, request data helps to define what results will be useful to the requester. In some embodiments, request data can be edited by the requester, system administrators, and/or other users.

Original posters 160 may follow certain guidelines when submitting data to create new Hunts, which may help to improve the probability that the Hunt will be solved. For example, an original poster 160 may be prompted to:

remove non-descriptive words from the description field and only using descriptive words with semantic meaning write longer descriptions for Hunts whose solutions are chosen based on subjective decision-making, e.g. open-ended Hunt types like "style me" and "what goes with this," provide a more structured description by clearly defining the context of the search aim for a title of a certain length, e.g. approximately 10 words for Hunts whose solutions are chosen based on an objective test, e.g. Hunt types like "this exactly," context is less important, but the description and title should highlight the desired object in the image (e.g. "I want the purse that the model is holding in the photo, not the outfit")

Be respectful to other users in their comments and other correspondence.

Figure 4:
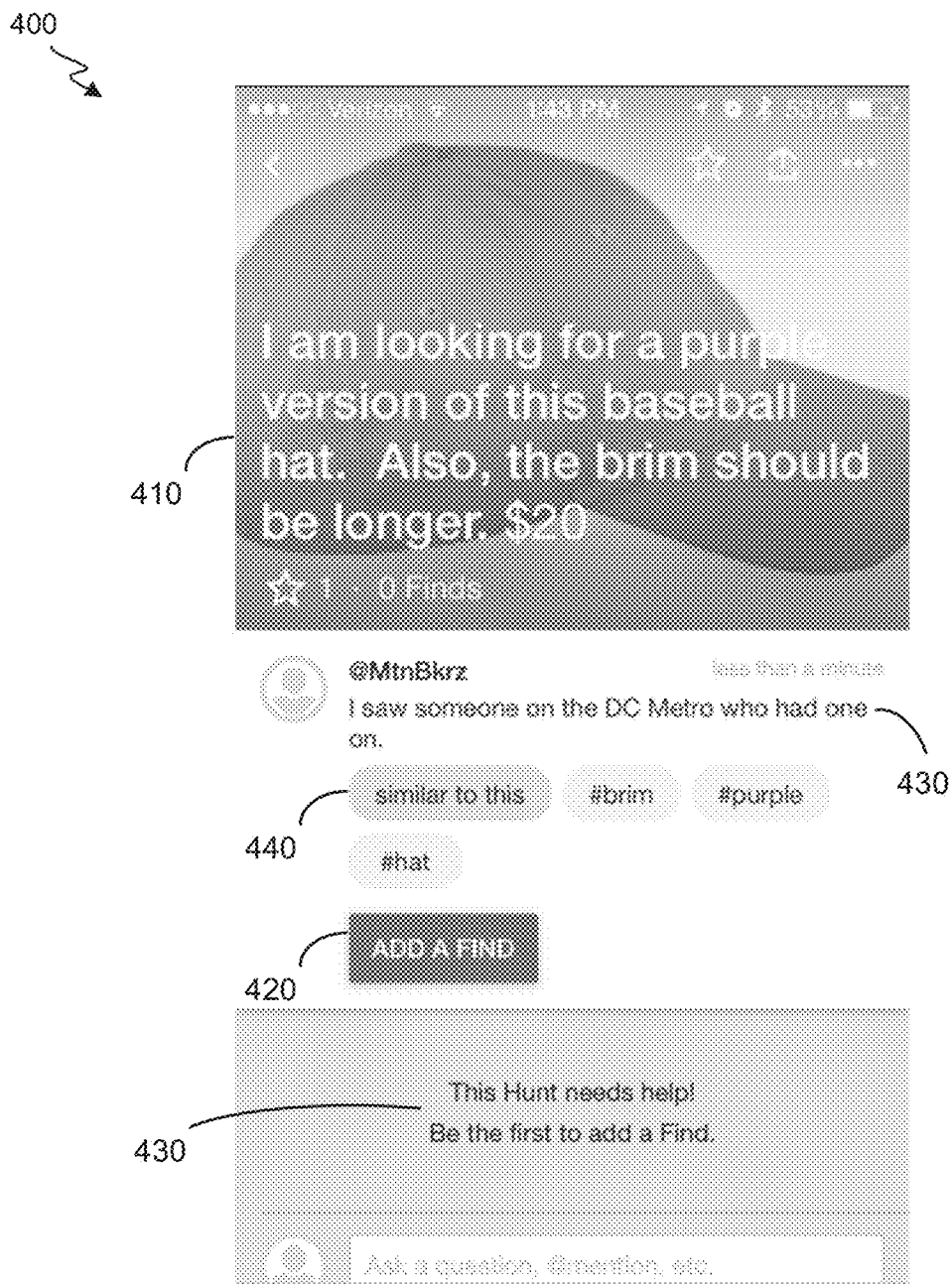
FIG. 4 is a screen capture of a user interface for displaying a resource request, according to an embodiment.

FIG. 4 is a screen capture of a user interface 400 for displaying a resource request, according to an embodiment. Once a request 120 has been created (e.g., using the shown with FIG. 3 above), a request is completed, and may be processed by responding systems 180. One way that some embodiments respond to a generated request 120 is to view a request summary in a user request, e.g., as shown in FIG. 4. Screen capture of user interface 400 is a representation of the "hat" example discussed with FIG. 3 above.

Comparing user interfaces 300 and 400, many entries from 300 are displayed in 400, e.g., image 305, 357 to 410, 359 to 430. It is worth noting that user interface 400 can be used by both requester and responders. User interface 300 is displayed after requester completes request, and also appears for responders after a search, or in their feed (discussed further below). To respond to this request, for example, responder selects "Add a Find" control 420, and is invited to provide additional information (responses are discussed starting at FIG. 11 below.

It is also worth noting that the type of request 440 (e.g., the relationship between the image and the sought resource) is prominently featured (e.g., shaded). Having types of requests not only allows requesters to fine-tune their request (broadening or narrowing, as needed), but it should also be appreciated that, in some embodiments, having type of request 420 allows responders to focus on types of request that they prefer.

FIGS. 5-10 below are screen captures that show different types of relationship implemented in some embodiments.

Figure 5:
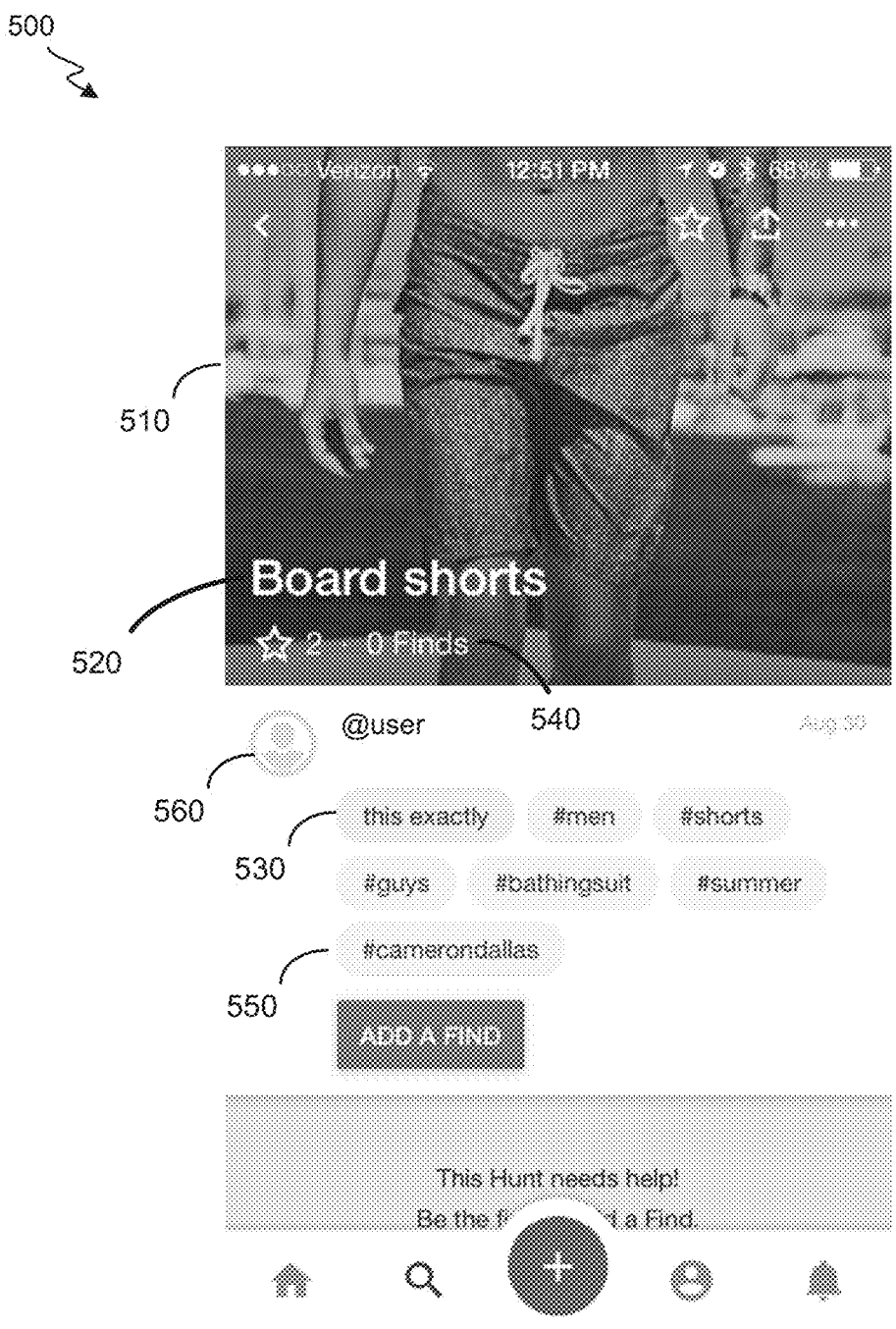
FIG. 5 is a screen capture of a user interface displaying a more detailed request for a resource location, according to an embodiment.

FIG. 5 is a screen capture of a user interface 500 displaying a more detailed request for a resource location, according to an embodiment. FIG. 5 is a request by a user 560 for location information for exactly 530 the board shorts 520 shown in image 510. It is worth noting that, with respect to tags (e.g., image metadata) listed (e.g., #men, #shorts, #summer), an additional tag is listed that reflects an additional condition: #camerondallas—this reference to a celebrity modifying the request in subtle ways (e.g., shorts to make me: look like the celebrity, that the celebrity would/does wear, and/or other similar conditions).

Figure 6:
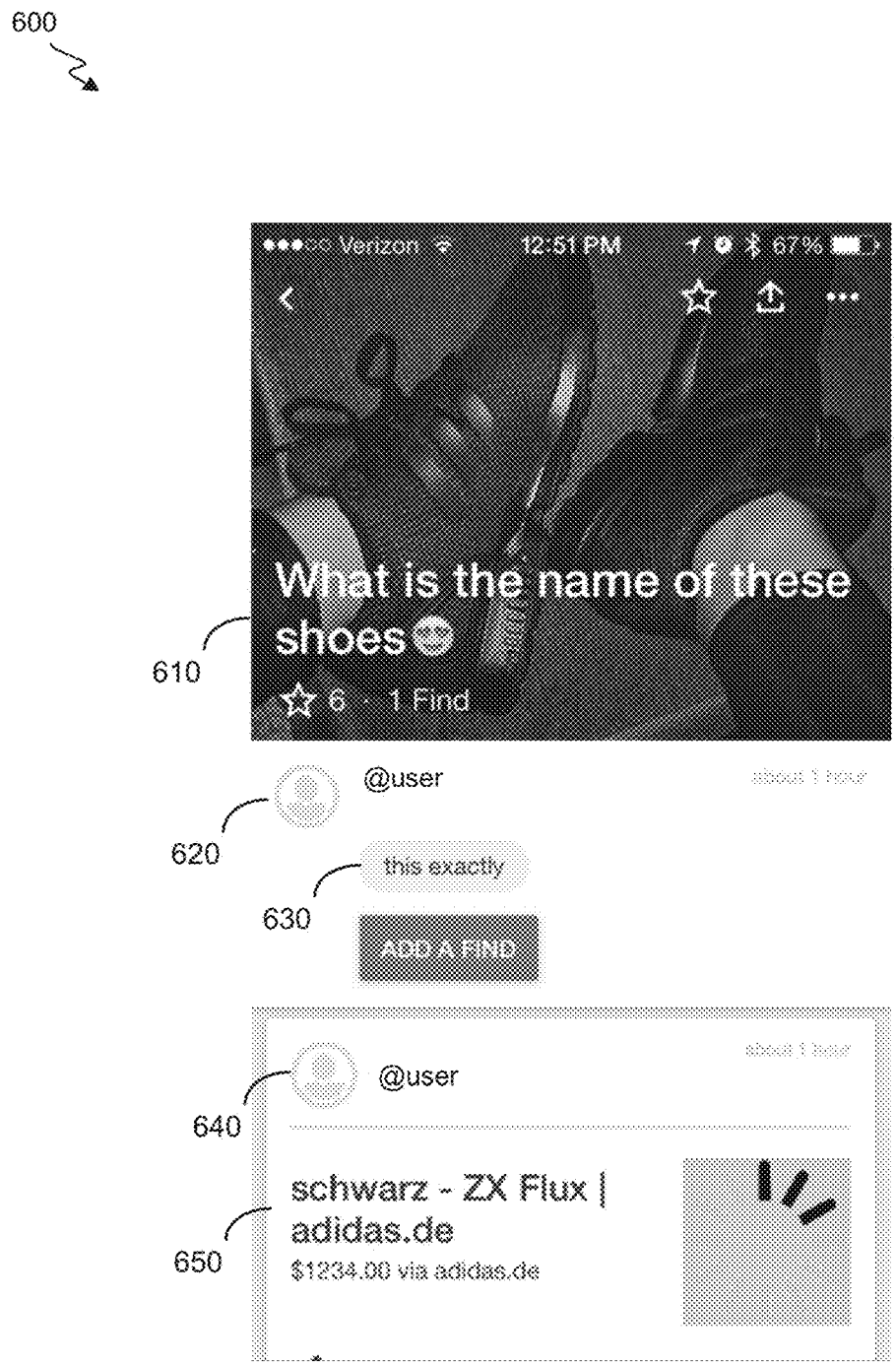
FIG. 6 is a screen capture of a user interface displaying a request for resource characteristics, according to an embodiment.

FIG. 6 is a screen capture of a user interface 600 displaying a request for resource characteristics, according to an embodiment. FIG. 6 is an example that uses the same relationship type as FIG. 5, but has a different resource. In this example, instead of information to locate exactly 630 a product, an exact name 610 of a product is requested by user 630. This variation highlights the flexibility and potential of different embodiments.

Figure 7:
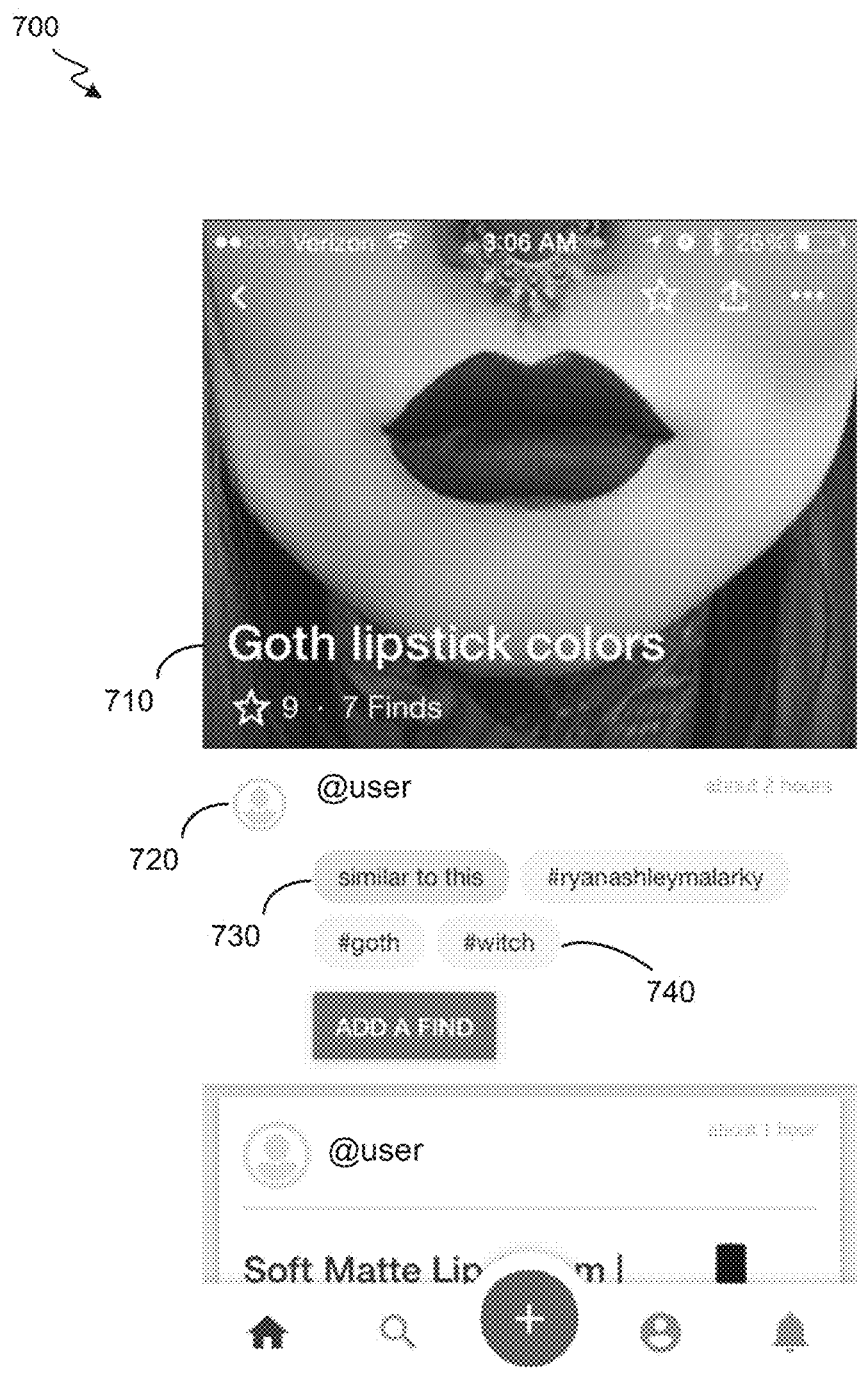
FIG. 7 is a screen capture of a user interface displaying a request for the location of multiple resources, according to an embodiment.

FIG. 7 is a screen capture of a user interface 700 displaying a request for the location of multiple resources, according to an embodiment. FIG. 7 uses a relationship type that specifies resources that are similar to 730 a resource shown in a displayed image (e.g., Goth lipstick colors). Similar to FIG. 5 above, in this example, the inclusion of the metadata "#witch 740" could act to change the character of the resources sought.

Figure 8:
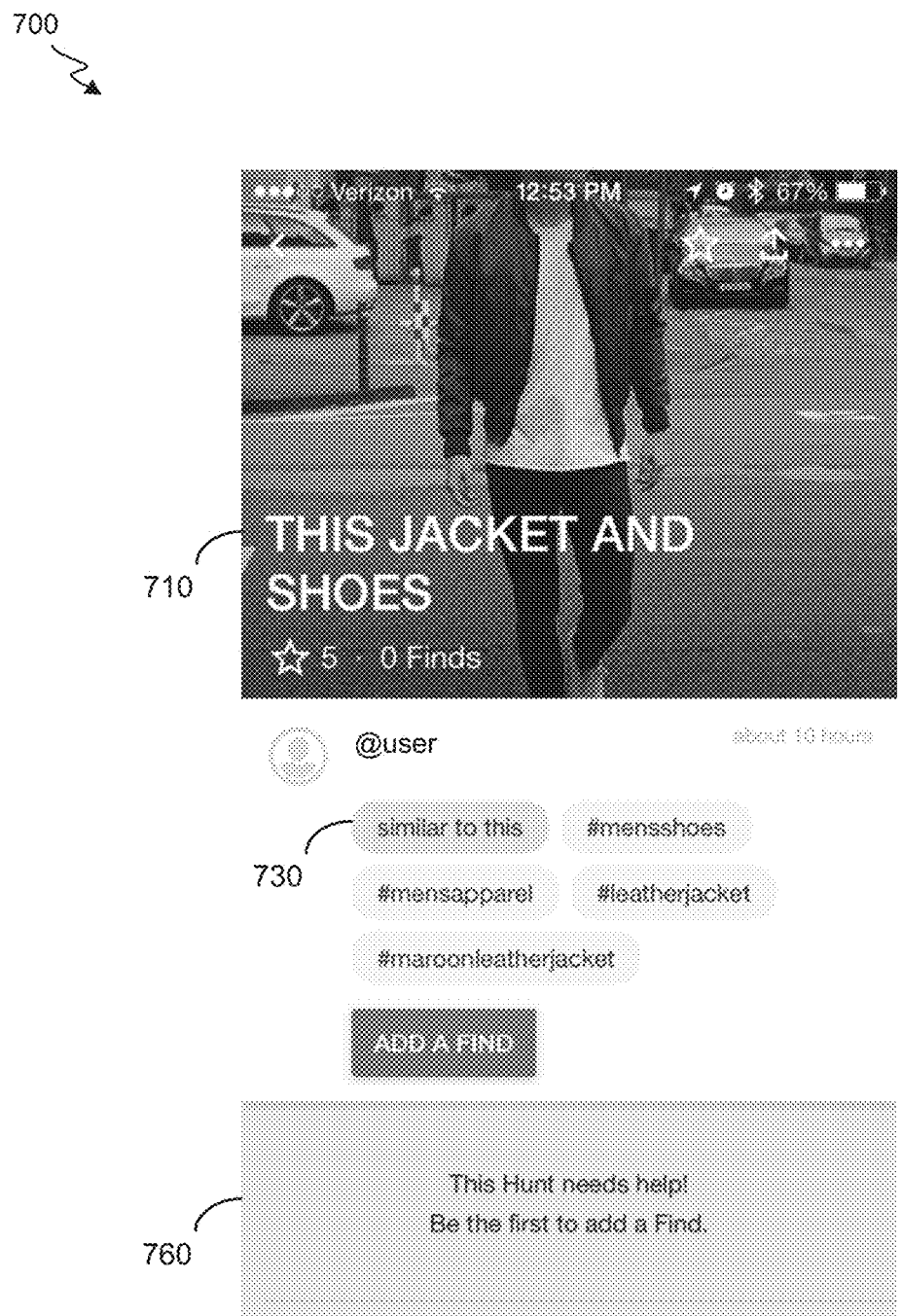
FIG. 8 is a screen capture of a user interface displaying another request for the location of multiple resources, according to an embodiment.
Figure 9:
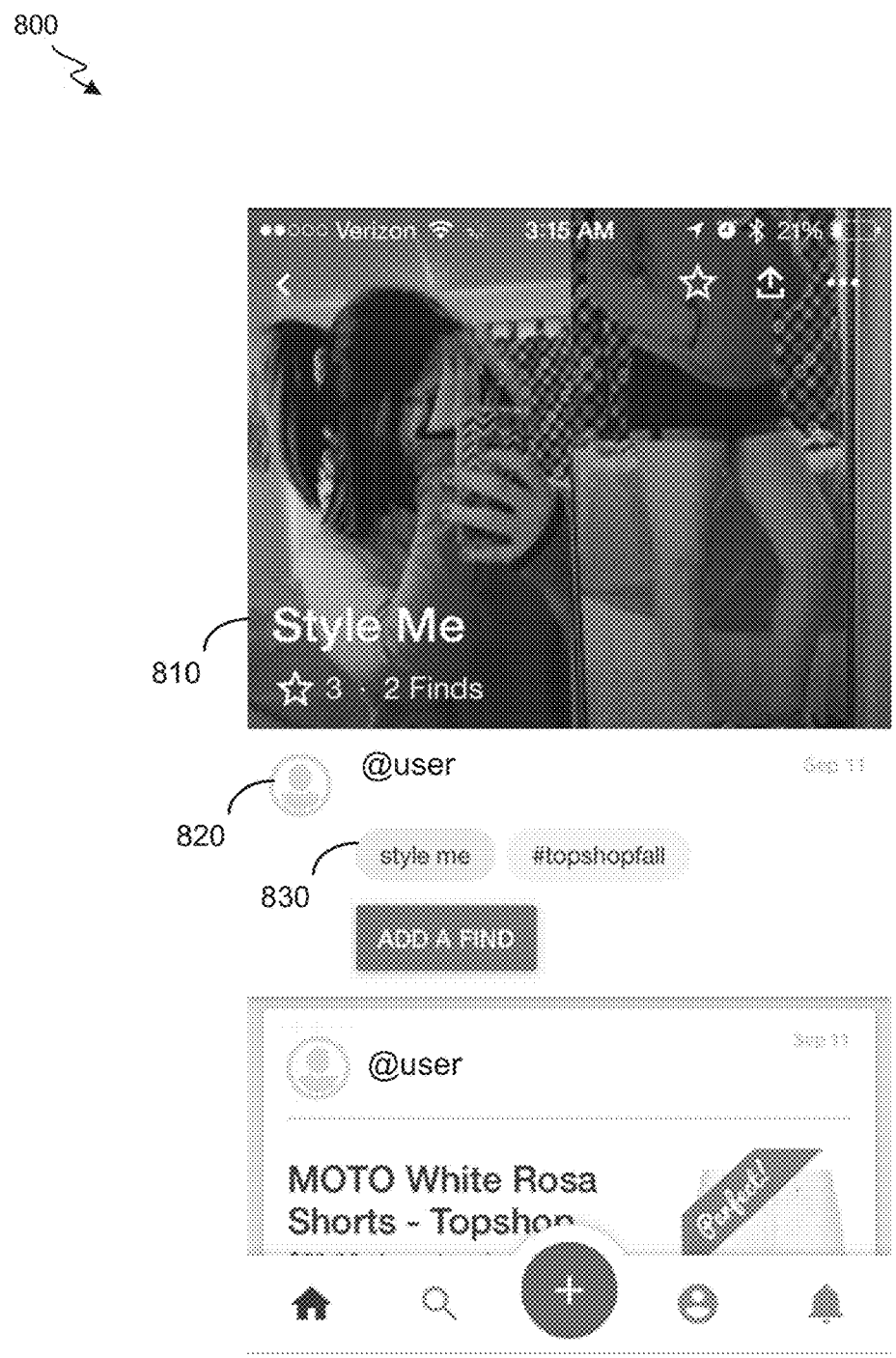
FIG. 9 is a screen capture of a user interface 900 displaying a request for the location of resources, according to an embodiment.

FIG. 8 is a screen capture of a user interface 800 displaying another request for the location of multiple resources, according to an embodiment. In this example, attached image 810 is used specify a resource location request for a portion of the resources shown in the image (e.g., jacket and shoes), and resources that are similar to 830 this portion are sought. In some embodiments, enabling the selection of a subset of a picture to focus on certain interesting elements, then flexibly changing the scope of the search (e.g., setting the structured "type" of relationship, as discussed above) provides significant advantages over conventional approaches. It should be noted that, as discussed herein, embodiments that use, at least this image and structured scope specifier, improve the operation of the computer while searching, by precisely targeting the resource sought, without excessive search terms.

FIG. 9 is a screen capture of a user interface 900 displaying a request for the location of resources, according to an embodiment. In some embodiments, this relationship-type can broaden a resource request to also be based on details of the requester, e.g., preferred style, skin-tone, hair color, budget, self-image, musical preferences, and/or other characteristics of a requester, e.g., the structured equivalent of: "Provide the locations of one or more resources that will complement me." In some embodiments, different type of information can be available about requesting users that can complement this type of request: e.g., demographic information, previous resource requests, responses a user has made to other resource requests, and/or other information known. In some embodiments, knowing information about this example user could allow embodiments to select other, comparable users for delivery of this resource request (discussed with queue 185 formation in FIGS. 11 and 12 below).

Figure 10:
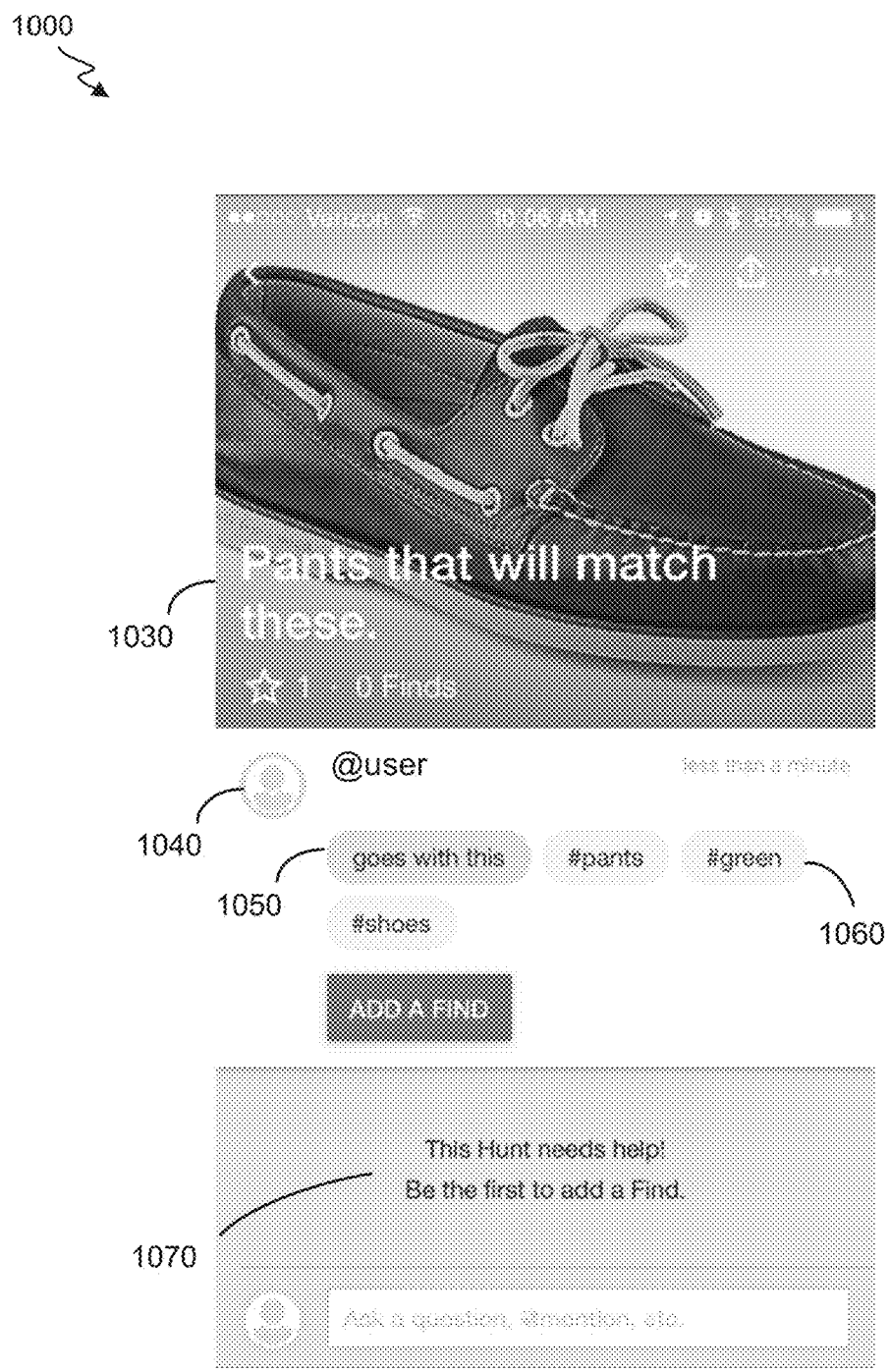
FIG. 10 is a screen capture of a user interface displaying the request for the location of a resource associated with another resource, according to an embodiment.

FIG. 10 is a screen capture of a user interface displaying the request for the location of a resource associated with another resource, according to an embodiment. This relationship type specifies that a resource (e.g., pants) sought "goes with" the displayed image 1030. As with other relationship types discussed above, this flexible specification can invite responders to evaluate intangible considerations.

III. Responding to Requests/Finds

FIG. 11 is a screen capture of a user interface displaying resource requests from a ranked queue of resource requests, according to an embodiment. In some embodiments, to promote interest from responding system users, a custom created queue is generated and delivered to each responding system to be displayed as a feed. Users can browse through resource requests, save them for later viewing, or click on a particular resource request to open an expanded view of it that may show more details. The feed may be used by users for a number of different reasons, for example to view and select requests to solve, to browse for ideas for their own purchases, or to gain insights about what items are currently in high demand.

To create the custom queues for each responding system, resource requests can be evaluated (e.g., for subjects that are likely to be of interest), and filtered (e.g., to remove items for which less interest is likely). The queue may be filtered by certain criteria, for example to only show Hunts for a particular produce (e.g., "shoes") or for Hunts of a certain type (e.g., ones where an exact match is sought). In some embodiments, data may be stored in the system in a "universal graph", a data structure for all users and objects in the system. Data stored may include, but is not limited to, tags, page views, comments, Hunts, solutions to Hunts, and user viewing history. In some embodiments, objects in the graph are connected to each other by the actions that can be performed on them. For example, a user may be connected to a product by saving a related Hunt of FInd, or by upvoting that product. In another example, a user may be connected to the tags on a Hunt by starting or favoriting that Hunt. Likewise, a product may be connected to the tags on a hunt when a user solves the hunt with that product.

In some embodiments, the contents of queues can be ranked based on combinations of criteria. Different types of criteria that can be used include, but are not limited to: the responding system for which the queue was created (prior resources found, demographics of users, interests), the requesting system from which a request in the queue originated (number of prior requests posted), a length of time that a request has been in the queue (e.g., need for response for older requests to foster user happiness), and the resource for which the location is sought by a request in the queue (e.g., different users may be experts for this resource, as evidenced by their positive feedback from other users and other responses).

In some embodiments, every entry in a user's queue has a probability analysis applied to it, such that a probability is estimated that the user will be interested in the entry. One having skill in the relevant art(s), given the description herein, will appreciate that these probabilities can be determined using a variety of approaches and that the contents of a queue can be controlled by the application of probability inclusion thresholds, and/or other limiting approaches.

Returning to FIG. 11, the resource requests listed from top to bottom are, in this example, the result of analysis that these are the most interesting to the viewing user. The feed may also show Hunts according to other criteria. For example, the feed may show the latest Hunts that have been posted to the system, or show a personalized feed of Hunts or products established in real-time as they enter or are the subject of interactions the system. The feed may show "trending" Hunts that are correlated with a certain threshold of social activity, for example they have received a minimum number of upvotes, saves, or comments. A more detailed discussion of feedback within some embodiments is found with the discussion of FIG. 18 below.

In some embodiments, the feed may be diversified based on automatically adding data from other users (e.g. popular data, recent data, related data, and/or other data determined to be potentially interesting to a user). Determining popularity is discussed with the "Request Popularity" section below. In some embodiments, different proportions (e.g., 20%) of a user's feed can be composed of material selected from other user's feeds using different approaches. By diversifying the feed in this way, user disengagement may be avoided such that the Hunts displayed are not chosen solely based on user behavior.

Details related to the requester, responder, resources located and other details related to a Hunt may be stored, analyzed, and used in various ways. For example, a personalization algorithm may recommend certain solved Hunts, unsolved Hunts, and other objects in the system to certain users based on an analysis of the users' tastes and the way they have solved Hunts in the past. This may be done with an analysis on user actions (e.g., the addition of tags, follows, upvotes, solution submissions, Hunt creations, etc.) and objects in the system (e.g. Hunts, solutions, tags, users, stores that may supply the items described in the Hunts, etc.). One having skill in the relevant art(s), given the discussion herein, will appreciate how analysis of a wide variety of user activities can influence the contents of user queues (e.g., feeds), the status of users within the system, and/or other system activities.

A. Request Popularity

As described above, in some embodiments, certain user actions may be used for a variety of purposes, including determining which hunts to display in a trending feed (e.g., a list of hunts sorted by popularity), determining sort order in the list of hunts and finds that are displayed in the feed for a tag, or to optimize the display of Hunts in order to increase the probability of unsolved Hunts being solved. For example, some user actions may be given a certain weight in an algorithm that corresponds with the "popularity" of a Hunt. In some embodiments, the algorithm may be modeled after a Wilson score interval.

Popularity scores may be generated for any object in the system, such as hunts, solutions, stores, and users. In one embodiment, an object's popularity (i.e., a hunt's popularity) score decays over time, implying more activity (user actions) must be earned to maintain a certain popularity score as a hunt ages. The decay rate is tunable and the weight given to various actions that affect the score are configurable. Popularity may be recalculated for a given object whenever a user performs an action on that object (e.g., an upvote, a comment, a solution, etc.). Objects may be added to a dirty list, which is a queue of objects that need their popularity score to be recalculated. The dirty list may then be processed by an asynchronous routine that updates the dirty list periodically or in response to a trigger.

In certain embodiments, the popularity of a Hunt could correspond to a certain weighting of the number of users "following" the hunt (i.e. those who have in some way indicated an interest in the Hunt, by saving or subscribing to it), the number of up-votes on solutions submitted for the Hunt, and the total number of solutions submitted for the Hunt.

The popularity of a solution to a Hunt could be correlated to a certain weighting of the number of comments left in relation to the solution, and the number of up-votes the solution received. A time decay factor may be applied to popularity algorithms so that their popularity score decreases after a certain period of time. In some embodiments one or more of the factors discussed above can be used to set a lower bound of a Wilson score confidence interval for a Bernoulli parameter, determining the relative popularity of items in the system. Using this approach can allow some embodiments to determine popularity with sparse data, as well as have items deprioritized in the system as those trends become less popular over time. One having skill in the relevant art(s), given the description herein, will appreciate that other approaches can be used to determine the popularity of different elements of the system.

The popularity score may be used in multiple ways, such as in determining the display order of Hunts in user's feeds. Additionally, the popularity score may be used in an "unsolved Hunts" algorithm, described in more detail below.

Figure 12:
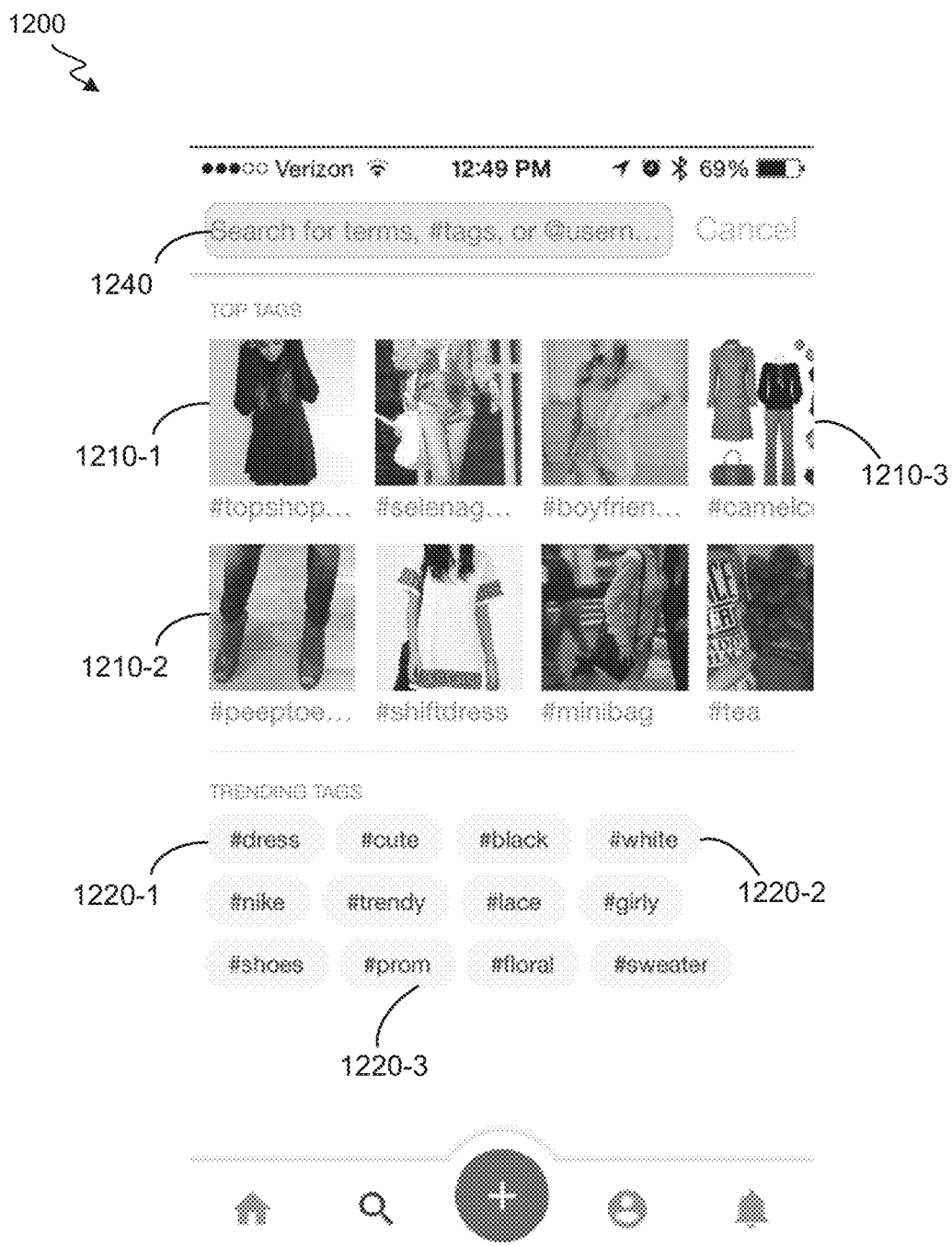
FIG. 12 is a screen capture of a user interface showing resource location requests associated with images and image metadata, according to an embodiment.

FIG. 12 is a screen capture of a user interface 1200 showing resource location requests associated with images and image metadata, according to an embodiment. FIG. 12 depicts search box 1240, top tags 1210, and trending tags 1220. In some embodiments, a responder can search for requests based on the tag metadata attached to images and/or search. Requesters can also search for related resource searches and solutions.

Top tags 1210 and trending tags 1220 are related to the discussion of custom feeds in FIG. 11 above. These tag lists are the results of analysis performed on system requests, responses and other interactions (e.g., messages), and can, in some embodiments, provide a good indication of what content will be interesting to which users.

B. Tag Associations

As described above, in some embodiments, users may submit tags related to an item associated with a Hunt they've created, or a solution they are submitting in attempt to solve a Hunt. Associations may be created between tags, in order to optimize targeting of Hunts to the users who will be most likely to solve them. The associations work to do this by protecting the quality of the data; that is, ensuring lower tag spam scores are given to Hunts that contain tags that are actually associated with the searched-for item, and higher tag spam scores are given to Hunts that contain tags that appear to be unrelated or distantly-related to the searched-for item and are instead likely just an attempt by the original poster at gaining additional page views. The tag spam scores may be used in a number of ways, for example as a factor in determining a Hunt's popularity score with a popularity algorithm as described above.

Some embodiments accomplish this by using a shortest path algorithm, in which the number of associations between tags are used to weight them and determine how closely related they are. Based on this determination Hunts may receive a higher or lower popularity score, i.e., Hunts that have tags that appear to be used fraudulently, as shown by the shortest path approach described herein, could receive a lower popularity score than Hunts that do not have tags that appear to be used fraudulently.

For example, four tags are received from User W who is creating a Hunt: Tag A, Tag B, Tag C, and Tag D. In the past, Tags A and B have been submitted together with an item 5 times, Tags B and C have been submitted together with an item 5 times, Tags C and D have been submitted together with an item 5 times, and Tags A and D have been submitted together with an item 1 time. The weighting of the associations between these tag pairs may be calculated, for example by dividing 100 by the number of associations between each tag pair. In this instance, the association between A to B=20; B to C=20; C to D=20, and A to D=100. From these values, it can be seen that the association of A to D could be arrived at in a path (also termed herein, a "sequence") of A to B to C to D, i.e. 20+20+20=60. This is a smaller value (also termed a "shorter sequence") than the direct path of A to D, i.e., 100. In some embodiments, based on this longer path being longer than a threshold amount (e.g., over 80), it might be concluded that User W was using tags to get more page views, rather than to assist with accurate categorization of the Hunt, and the Hunt's popularity score could be decreased accordingly. One having skill in the relevant art(s), given the description herein, will appreciate that different threshold values can be used to implement different embodiments of this approach.

In some embodiments, the links (associations) between tags that have an association score above a threshold can be discarded. In the example above, the link between tags A and D could be discarded from certain analyses made by the system. This algorithm can be used for any database of entries, e.g., for more than just Hunts.

User-inputted details related to the creation of a Hunt may be sent at 152 to a database 101, where they may later be processed by one or more processing modules 175. In certain embodiments, some of the above input elements may be required or optional for the original poster 160 to enter in order to submit a Hunt. In one embodiment, if required elements are not entered, an error message may be displayed to the original poster 160. The error message may prompt them to complete the form.

C. Responses to Requests for the Location of Resources

Figure 13:
FIG. 13 is a screen capture of a user interface displaying a message in response to a resource request, according to an embodiment.

FIG. 13 is a screen capture of a user interface displaying a message 1300 in response to a resource request, according to an embodiment. In certain embodiments, users from an image search community 129 (e.g., any user of certain embodiments) can submit certain data at 153 relevant to one or more item(s) that may meet a certain Hunt's criteria for acceptable results via the user interface. Such information may include, but is not limited to, a website URL, tags, image file, price, title, description, and comments.

Returning to the example discussed with FIGS. 3 and 4, message 1300 represents a response by a responding user to the request "for a purple version of this baseball hat." In some embodiments, a solution can identify a merchant that sells an item, and merchant 1325 selling item 1320 is shown in FIG. 13. Other types of solutions may exist in some embodiments. For example, the original poster may specify that a URL is required and that the item is to be available, as opposed to an old picture for an item that is no longer being sold. Other solution or Hunt types are described below.

Comments included with a solution may be structured such that the original poster and other users may be more likely to purchase the item(s). For example, comments could include information regarding the item(s) availability, reliability, return policy, shipping policy, overall quality, size, color, and fit, which the original poster and other users may find desirable. In some embodiments, the system may supplement responses provided by users with additional information the may be purely informative, and/or may make user more likely to purchase an item. In some embodiments, the supplementation may be generic (e.g., the same for all users viewing a product), and/or the supplementation may be specific to a user (e.g., the system may use different, known information about a user to select a presentation of a product so as to make it most appealing to that user).

In some embodiments, the metadata-assisted visual search engine 199 may search for solutions in a database 101, and submit them at 151 as solutions to a Hunt. This may be done in addition to user-submitted solutions as described above. For example, the database 101 may contain solutions for previously solved hunts that appear to meet the criteria of unsolved hunts. This matching may be done in a number of ways, including through image recognition techniques that compare images submitted with a new Hunt with images submitted with previously-solved Hunts, and recommending the best solutions from those previously-solved Hunts as possible solutions to the new Hunt.

When solutions for a Hunt are submitted by users or by the metadata-assisted visual search engine 199 via an image-matching algorithm, the original poster 160 may receive a notification through the application and/or by email, text, or other communication path (see, for example, the discussion of FIG. 17 below). The notification may provide a link to the solution. By following that link, a user may be presented with a link to a store to buy the item, a comment section to submit a comment, and/or the option to upvote the solution, save it, or select it as a "perfect solution," indicating that it exactly meets the criteria set forth by the original poster 160 (see, for example, the discussion of feedback with FIG. 18 below). In the case that the solution is presented by the visual search engine 199 via an image-matching algorithm, the original poster may have the option to approve the item before it is added to the Hunt as a solution.

In some embodiments, any user can upvote and/or downvote a solution, while only the original poster can indicate a solution was a "perfect solution" as described above, in some embodiments, "perfect" solutions may be awarded based on approaches that involve other users (e.g., voting, appointed expert groups, and/or other collaborative approaches).

In some embodiments, any user can provide a solution, and in some embodiments only certain users can view and/or respond to certain requests (e.g., only experts in a subject matter may be allowed to view certain requests). Users who save one or more solutions may view these saved solutions together for easy reference. All items whose purchases that are tracked (as discussed with FIG. 1B above) may be saved automatically so the system can process the transaction and confirm the Hunt was solved and/or the item was purchased.

Figure 14:
FIG. 14 is a screen capture of a user interface displaying messages in a system for locating resources, according to an embodiment.

FIG. 14 is a screen capture of a user interface displaying messages in a system for locating resources, according to an embodiment. In some embodiments, users can post comments on a Hunt. This feature may be particularly useful in order to elicit clarifying information from an original poster 160 as to the acceptable range of criteria for a Hunt, e.g. when the original poster 160 doesn't quite know how to frame their Hunt or is framing the Hunt is such a way that might produce inferior results.

For example, User A can post a comment on a Hunt for a specific shirt that includes a statement, "the color you're requesting was discontinued 3 years ago; would any other colors be acceptable?" The original poster 160 could post a comment in reply to User A, e.g. "Yes, any color is acceptable." The original poster 160 could also edit the Hunt's details to reflect the broadened parameters of acceptable results.

In the example shown in FIG. 14, the original poster 160 has received a response to a request (e.g., as shown in FIG. 13). This solution is not exactly what the original poster 160 was looking for however, and FIG. 14, shows a response to the solution: "The brim still looks too small." What results from this, in some circumstances, can be a productive exchange of information where both parties benefit from the exchange. In some embodiments, system users gain extra benefits, not only from posting and responding, but also for simple exchanges, such as the example shown in FIG. 14.

D. Unsolved Hunts

In certain embodiments, approaches may be used to optimize the display of Hunts in users' feeds in order to improve the probability that unsolved Hunts become solved. In one embodiment, a "needs help" score is calculated for unsolved Hunts, which determines the order in which those unsolved Hunts will be displayed to any particular user in their feed (see, for example message 430 from FIG. 4—"This Hunt needs help! Be the first to add a Find."). The "needs help" score (also termed just a "help" score herein) may be calculated in a number of ways.

In some embodiments, the "needs help" score increases up to a maximum value determined by, for example, the number of users following the Hunt, the time that has elapsed since the Hunt was created (also termed the age of the Hunt), and the number of solutions that have been submitted for the Hunt. The "needs help" score may also factor in the Hunt's popularity score calculated by a popularity algorithm, described in more detail above. After a certain predefined time (e.g. 72 hours) of being at maximum, the score decays (e.g. along a Newtonian cooling curve).

In some embodiments, the needs help score for Hunts submitted by first-time users (i.e. those who have never submitted a Hunt before) may begin at a higher value, have a longer predefined time of being at the maximum, and/or decay more slowly than the score for Hunts submitted by other users.

In some embodiments, the needs help score may be used to calculate a weighted probability. The highest scores may be selected for a weighted random pick based on their score. The Hunts with higher scores are shown to more users than the ones with lower scores. This may be done by populating them more often in users' feeds, and/or by featuring them prominently in a special feed devoted to unsolved Hunts.

E. Search

Figure 15:
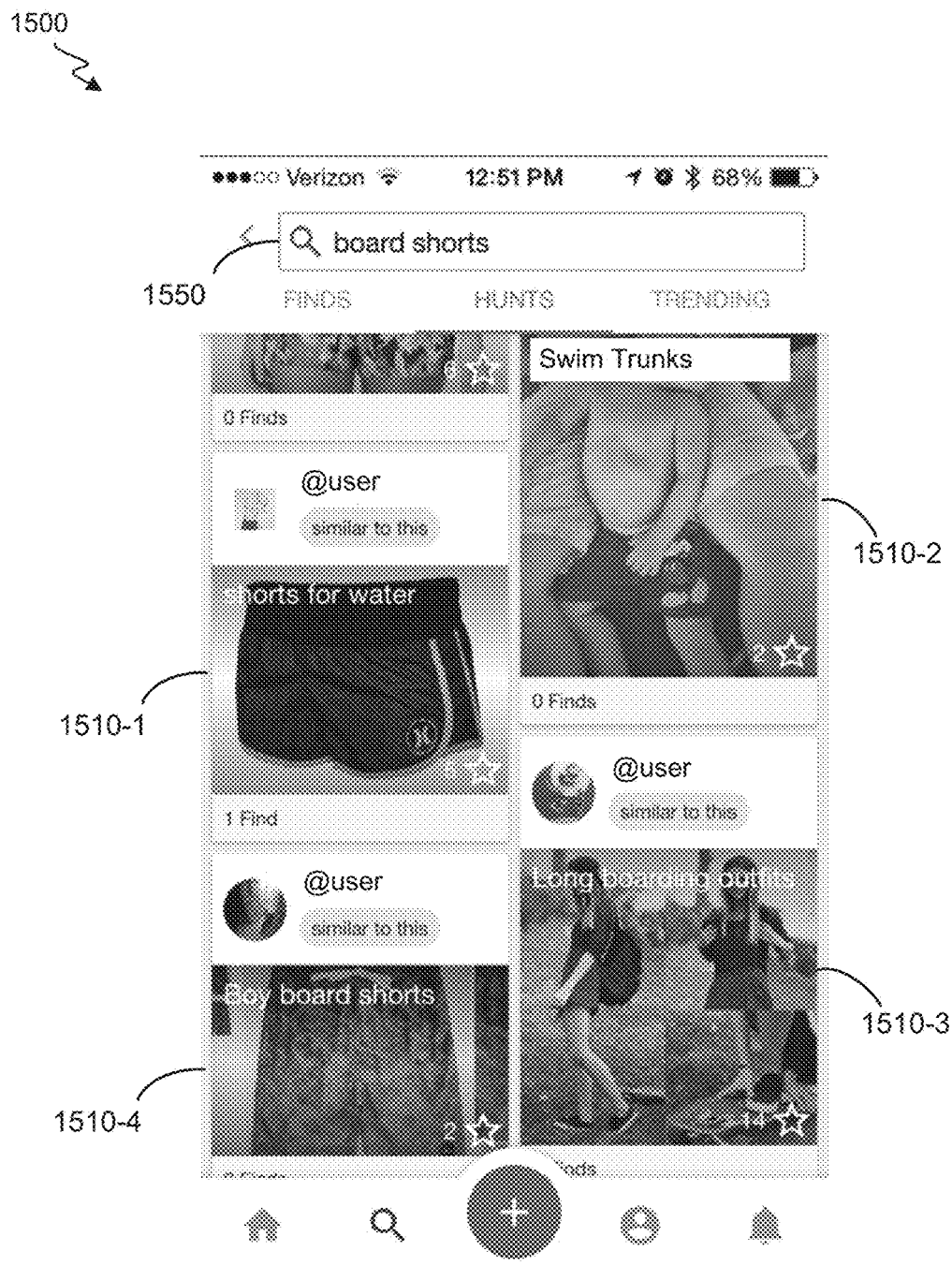
FIG. 15 is a screen capture of a user interface for searching requests for the location of resources, according to an embodiment.

FIG. 15 is a screen capture of a user interface for searching requests for the location of resources, according to an embodiment. In some embodiments, users can search request and responses based on structured and unstructured data associated with the items. In a structured search, a user may search Hunts and Finds based on the metadata (e.g. tags) associated with the Hunts and Finds, and/or the images associated therewith. As discussed above with FIG. 3, one or more tags can correspond to the item sought by a Hunt. Each tag is a keyword or keyphrase can be used for identifying entries associated with the keyword or keyphrase. In one embodiment, a user searching for Hunts for women's shoes may enter one or more tags related to this search. In response, the system can provide Hunts that match the one or more tags entered by the searching user.

The search can be performed in various ways, and the keywords or keyphrases can be entered in various ways. For example, a user can select a key (key word or phrase) from a list. In such a situation, these keys can quickly be used to search a database, as the available keys are predetermined. For example, the key can correspond to a particular numerical value in a field, and all record entries with that numerical value can be retrieved.

As another example, a key-based lookup can convert the key to a hash, where the hash can correspond to or be used to determine a numerical address for a list so that it can be rapidly looked up again later. In one implementation, the system stores IDs for hunts in a list associated with a single key in a cache. For example, the tag "shoe" could be a key and the value associated with it is a large list of hunt IDs, which may be ordered by descending popularity. A lookup by tag returns that list quickly and the hunts associated with those ids can be paginated into view. This can happen when a user clicks or touches a tag or types #shoe (with the hash "#") into the search box.

In another embodiment, the search can use character strings to search for records, where searches are performed by comparing a search string to character strings of records to identify one or more matches. An index (lookup table) may be used as a performance enhancement. For example, one column can be searched for the string and that row can specify all Hunts that correspond that that search term. In one implementation, if a user enters "shoe" without the hash "#" into the search box, a text-based search is performed, which may include the tag field as well as description, title, etc. When the "#" is used, only hunts explicitly tagged with #shoe are returned. In the latter, the hunts may not be tagged.

F. Related Tags

In some embodiments, when a user clicks on a first tag related to a Hunt or a solution, certain other tags that may be related to the first tag may be displayed to the user using a "related tags" algorithm. This may be done by retrieving all of the Hunts and solutions that have the first tag and sorting all of the other tags associated with those Hunts and solutions by their frequency. In response to the user's click on the first tag, one or more of the most frequently used tags may be shown to the user as "related" to the first tag. The user may then click on one of the "related" tags, which may then reinitiate the above-described process wherein the click on a related tag is treated like the click on the first tag described above. This algorithm can allow users to navigate among Hunts and solutions in a way that does not require them to use a search bar or click through a tree of categories, and therefore they may discover new things without continuously having an end destination in mind.

G. User Profiles

Figure 16:
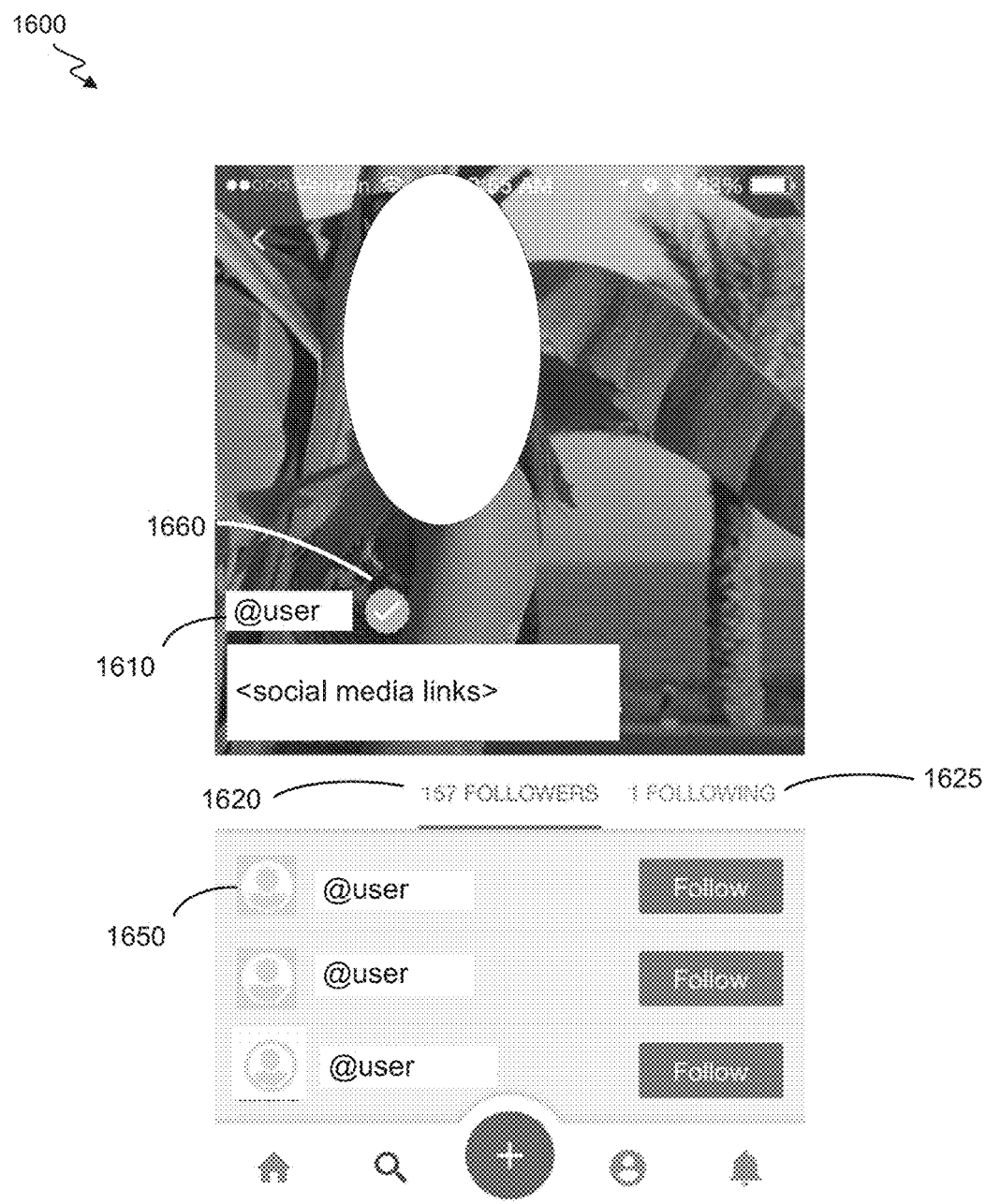
FIG. 16 is a screen capture of a user interface displaying a system user, according to an embodiment.

FIG. 16 is a screen capture of a user interface 1600 displaying a system user, according to an embodiment. In some embodiments, users of responding system 180 have user profiles viewable by other users, such profiles having statistics showing their involvement with the system (e.g., number of responses to requests (not shown), numbers of requests (not shown)). Also, in some embodiments, users can be "followed" by other users (e.g., following number 1625, number of followers 1620, follower 1650), with some of their activities leading, for example, to notifications to following users (e.g., see FIG. 17).

Figure 17:
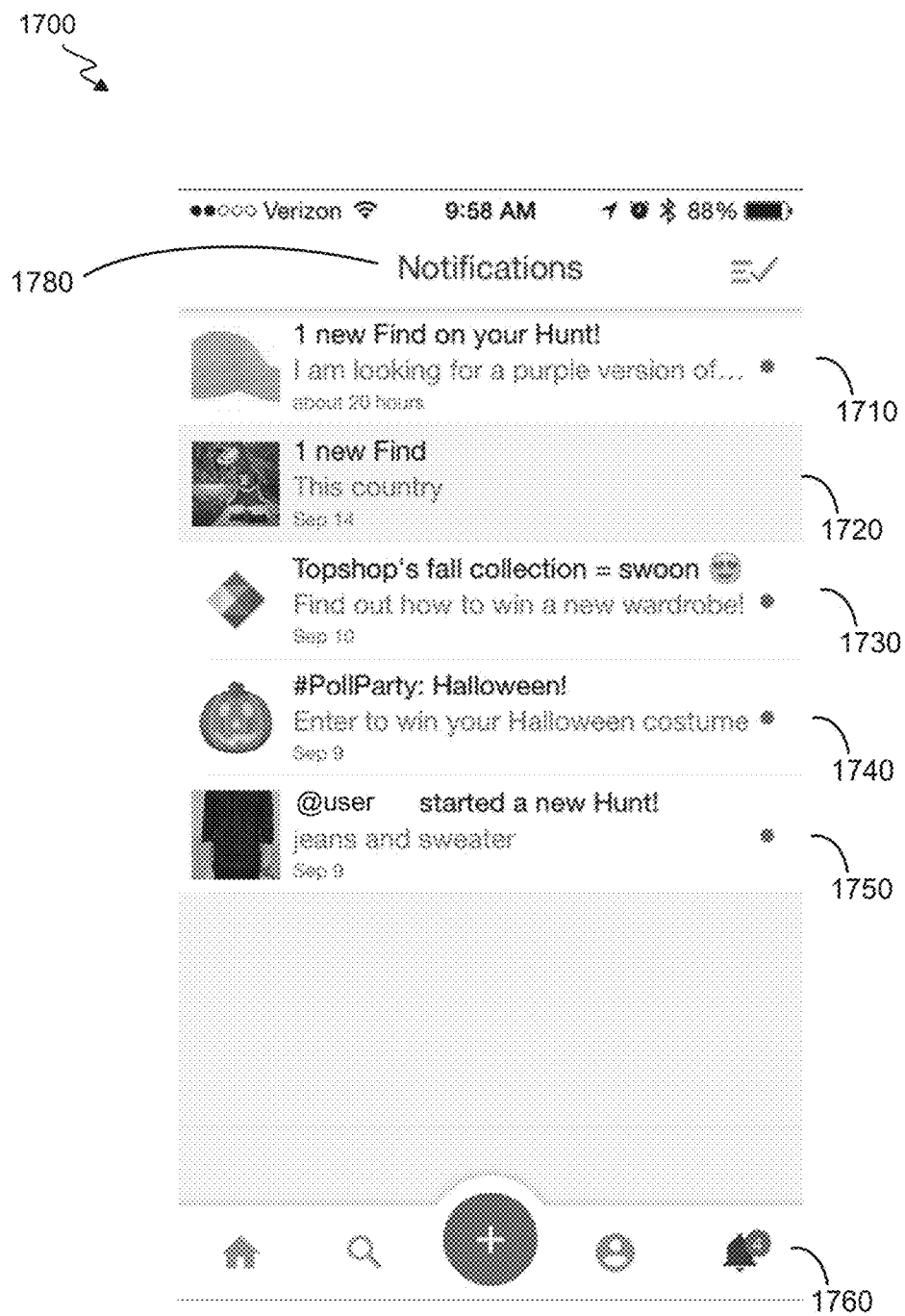
FIG. 17 is a screen capture of a user interface showing notifications, according to an embodiment.

FIG. 17 is a screen capture of a user interface 1700 showing notifications, according to an embodiment. In some embodiments, notifications 1780 screen is available to users to alert users to different events and activities. In some embodiments, selecting a notification entry navigates the user interface to a screen related to the notification.

For example, entry 1710 alerts a user that a response has been received to resource request (a new find), this signifying that results are available for review. Selecting this entry takes the user to the response to the request. Entry 1720 is a notification that a resource request of another user has a new result posted (a new Find) to their resource request. In some embodiments, users can follow hunts as well as other users. As noted herein, in some embodiments, users can be both requesters and responders, and following requests and responses from other users can benefit their overall experience.

Entry 1730 is a general notification from an entity (e.g., "Topshop"), such notifications being, in some embodiments, promoting system activities (e.g., sales of products, new feature rollouts, events of affiliates, and/or other system events). Entry 1740 notifies users of new tags to be used for system activities. For example, the tag noted in entry 1740—"PollParty"—can by used in system activities (e.g., requests and responses), and users can be rewarded with system benefits. Entry 1750 notifies the user that a followed user (e.g., the user shown in FIG. 16) has posted a new resource request (e.g., a Hunt for "jeans and a sweater").

For some embodiments, notifications of users of a broad range of system events and activities is a key way of improving the user experience of users. In addition to notifications 1780 screen, notifications can be sent by email, text message, and/or other communications channels.

H. User Feedback

Figure 18:
FIG. 18 is a screen capture of a user interface displaying responses to a resource location request, along with requester classification of the responses, according to an embodiment.

FIG. 18 is a screen capture of a user interface displaying responses to a resource location request, along with requester classification of the responses, according to an embodiment. As described above, in certain embodiments, and as shown in FIG. 18, the original poster 160 can classify a solution to a Hunt as "perfect," to indicate that the solution is acceptable (i.e. the solution contains a source for obtaining the product(s) that meet the Hunt's description as set forth by the original poster). In some embodiments, additional granularity of rating is provided, and "perfect" may be at the top of the scale, and other classifications may be available (e.g., great, good, OK, etc.). As discussed with FIG. 16, users can gain system benefits based on different types of involvement, and in some embodiments, ratings of solutions are highly weighted for the purpose of rating user involvement.

In some embodiments, users can post comments on, "up-vote", and/or save solutions to Hunts that have been submitted by users. This feedback data may be stored, aggregated and analyzed for a variety of purposes, for example to optimize the display of Hunts in order to increase the probability of unsolved Hunts being solved (see the discussion of Unsolved Hunts above). In some embodiments, approaches may be used to rank the solutions provided to a Hunt, this ranking being most useful in circumstances where a large number of solutions are presented for a Hunt.

In some embodiments, users may receive certain feedback when the solutions they submit are upvoted or marked as a perfect solution. For example, a user whose solution is upvoted by another user may receive a notification that this activity has occurred. A user may also get a notification when their solution has been chosen as a perfect solution. Users may also receive "awards" in such cases, for example they may receive a badge in the form of an icon, visible to other users, that indicates they have received the award. Such notifications may work to increase user engagement.

IV. System Servers

Figure 19A:
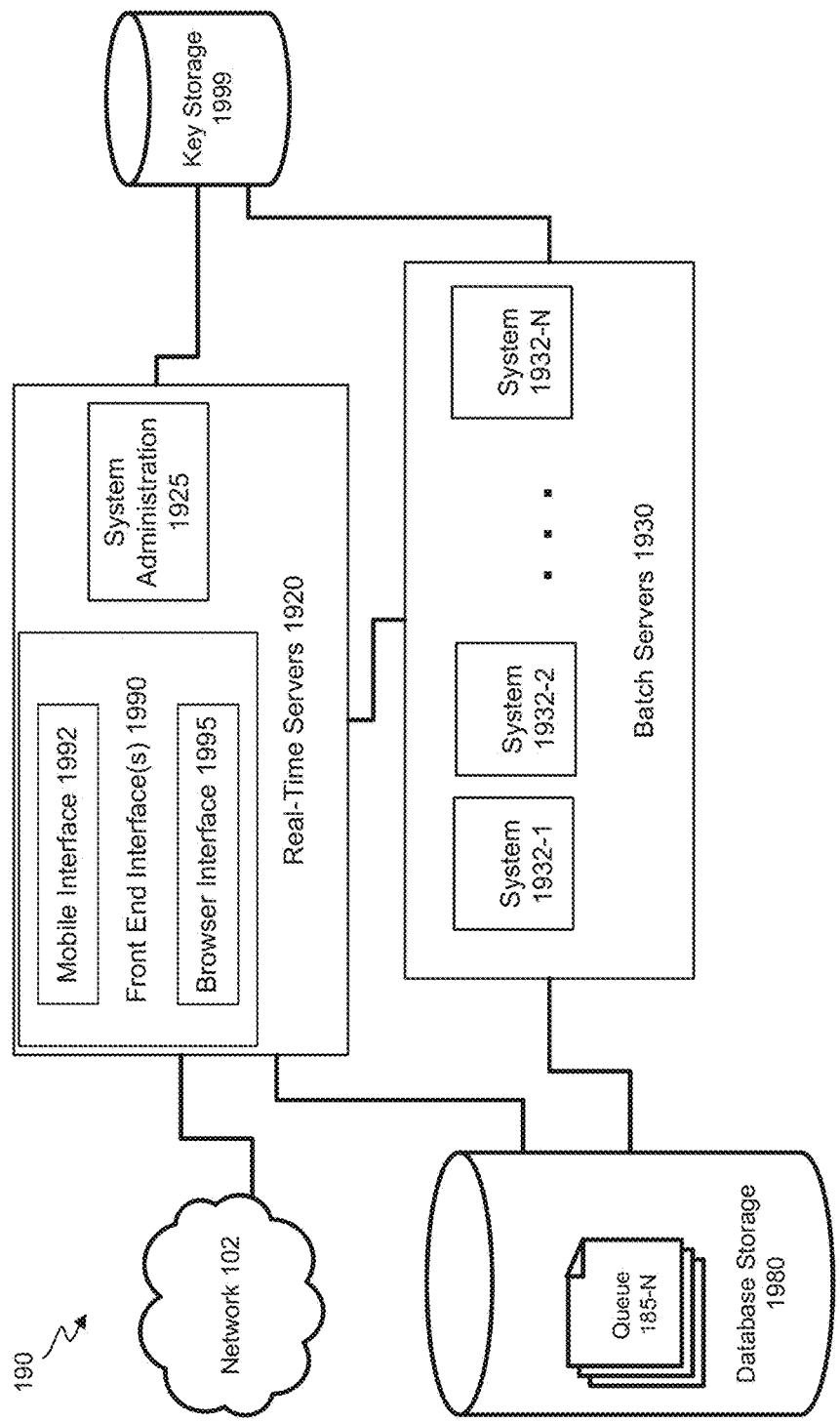
FIG. 19A is a high-level block diagram of servers in a system for locating resources, according to an embodiment.

FIG. 19A shows a simplified blocks diagram of system servers 190, as discussed with FIG. 1. Blocks listed in this figure and FIGS. 1A-1B, can represent individual server computer systems, linked blocks of multiple server computer systems, virtual server systems, and/or other variations of server function placement.

Database storage 1980 is a simplified block indicating the storage of different system information. Example information stored in database storage 1980 includes queues 185-N, these data structures being generated and frequently updated by some embodiments. Key storage 1999 is a simplified block that represents high-speed database key storage, update and retrieval, used by some embodiments.

Real-time servers 1920 block represents one or more servers operating for minute-to-minute operations of some embodiments described herein. Example functions are shown in this class, e.g., processes to operate front-end interfaces 1990 (mobile interface 1992 and browser interface 1995). Also, a simplified block representing system administration 1925 is included, this block representing minute-to-minute processes performed by some embodiments, including, but not limited to, controlling batch server 1930 processes, handling results that are instantly available to users (e.g., displaying a posted request, even before it reaches database storage 1980).

Batch servers 1930 is a simplified block that represents processes that can be performed, by some embodiments, in a batch mode. System 1932-N functions can be termed to be performed by "workers," and can operate on one or more hardware computer systems. Example systems 1932-N include, but are not limited to:

1. Clock worker (manages cron jobs)
2. Affiliate worker (handles API calls related to affiliate networks)
3. Analytics worker (batches API calls to Amplitude)
4. Collection worker (predetermines and stores feeds in a key server, e.g. Redis)
5. Crawl worker (handles image crawling for SAH and AAF)
6. Email worker (sends all email)
7. Facebook worker (handles API calls to FB)

8. Geocoding worker (handles API calls to geocoding service)
9. Heavy notification worker (handles batch jobs against notifications table)
10. Image copy worker (syncs new images from production s3 bucket to demo and dev buckets)
11. Image recognition worker (handles API calls to Alchemy)
12. Image reprocess worker (used when generating a new image format)
13. Image worker (processes user-submitted images and generates multiple image formats for use on the website and mobile apps)
14. Kinesis EventLog Worker (handles API calls to AWS Kinesis for tracking user actions)
15. Migration Worker (used when migrating data or performing long-running batch jobs against the database)
16. Notification Worker (creates in-app notifications)
17. Parse Low Priority Worker (handles badge update push notifications)
18. Parse Worker (handles API calls to Parse for sending push notifications)
19. Personalization Worker (handles API calls to personalization infrastructure on AWS)
20. Score Worker (handles popularity calculation)
21. Search Index Worker (handles search index queue and API calls to WebSolr)
22. SMS Worker (handles API calls to Twilio)
23. Tag Follow Worker (handles batch following and unfollowing of tags per user)
24. Tag Collection Worker (generates feeds for tag pages)
25. Tags Followed Collection (calculates feed generated by users following tags during onboarding)
26. Sidekiq Worker (handles anything else asynchronous that isn't covered by one of these workers)
27. Slack Worker (handles API calls to Slack)

It should be appreciated that some embodiment can utilize additional or fewer types of real-time 1920 and batch servers 1930.

V. Computer System

Figure 19B:
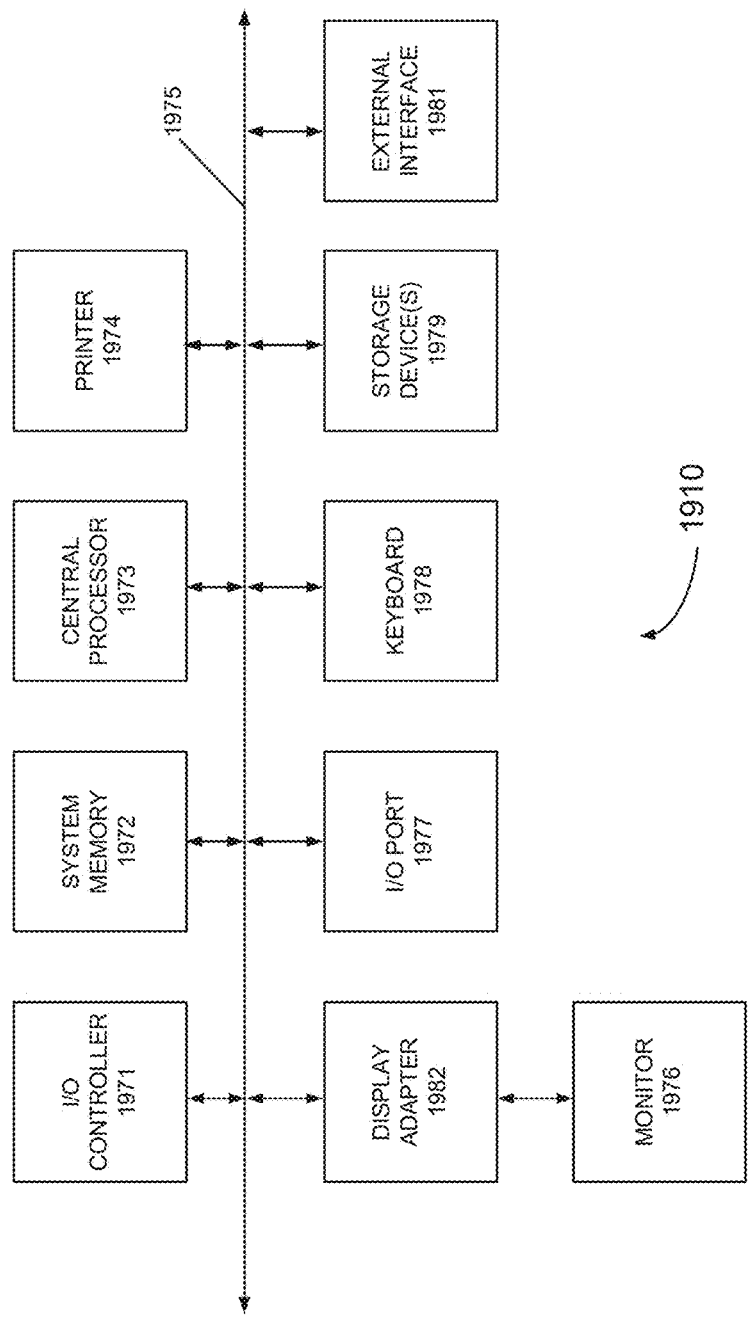
FIG. 19B is a high-level block diagram of a computer apparatus, according to an embodiment.

Any of the computer systems mentioned herein (including, but not limited to, desktop and laptop computers, tablets, mobile phones and other mobile devices, etc.) may utilize any suitable number of subsystems. Examples of such subsystems are shown in FIG. 19B in computer apparatus 1910. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 19 are interconnected via a system bus 1975. Additional subsystems such as a printer 1974, keyboard 1978, storage device(s) 1979, monitor 1976, which is coupled to display adapter 82, and others are shown. Peripherals and input/output (I/O) devices, which couple to I/O controller 1971, can be connected to the computer system by any number of means known in the art such as input/output (I/O) port 977 (e.g., USB, FireWire). For example, I/O port 1977 or external interface 81 (e.g. Ethernet, Wi-Fi, etc.) can be used to connect computer system 10 to a wide area network such as the Internet, a mouse input device, or a scanner. The interconnection via system bus 1975 allows the central processor 1973 to communicate with each subsystem and to control the execution of instructions from system memory 1972 or the storage device(s) 1979 (e.g., a fixed disk, such as a hard drive or optical disk), as well as the exchange of information between subsystems. The system memory 1972 and/or the storage device(s) 1979 may embody a computer readable medium. Any of the data mentioned herein can be output from one component to another component and can be output to the user.

Another subsystem is a data collection device 1985, such as a camera, microphone, accelerometer, and the like. For example, an image can be taken by a camera and then stored in storage device(s) 1979, and may be uploaded to a server using external interface 1981.

A computer system can include a plurality of the same components or subsystems, e.g., connected together by external interface 1981 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method of using images and image metadata to locate one or more resources, the method, performed by a server computer system, comprising:
   receiving from a plurality of requesting systems, a plurality of requests, each request of the plurality of requests requesting a location of a resource and including:
      an image related to the resource,
      information specifying how the image and the resource are related, and
      metadata for the image;
   for each of a plurality of responding systems, creating a queue that contains requests of the plurality of requests;
   ranking requests in each queue in accordance with criteria based on one or more of:
      the responding system for which the queue was created,
      the requesting system from which a request in the queue originated,
      a length of time that a request has been in the queue, and
      the resource for which the location is sought by a request in the queue;
   sending each queue to the responding system for which the queue was created, each queue specifying an order in which the requests are to be displayed at the responding system;
   receiving, from a first responding system of the plurality of responding systems, a first response to a first request of the plurality of requests, the first response including a first location of a first resource included in the first request;
   receiving a plurality of tags corresponding to the first resource, each tag being a keyword or keyphrase to be used for identifying requests associated with the keyword or keyphrase;
   determining a number of times a first pair of tags of the plurality of tags appears in another request of the plurality of requests, the first pair of tags comprising a first tag and a second tag;
   assigning a first score to the first pair of tags, wherein the first score is based on the determined number of times the first pair of tags appears in another request; and
   validating at least one of the first tag or the second tag based on the first score.

2. The method of claim 1, further comprising:
   updating one or more of the queues created for the plurality of responding systems to include the first response.

3. The method of claim 1, further comprising:
   receiving, from a first requesting system, a selection of the first response; and
   updating one or more of the queues created for the plurality of responding systems to include the selection of the first response.

4. The method of claim 1, further comprising:
   determining an age of each of the plurality of requests;
   determining a second score for each of the plurality of requests based on the age of each request;
   identifying, based on the second scores, a first request of the plurality of requests for a response reminder; and
   updating one or more of the queues created for the plurality of responding systems to include the response reminder for the first request.

5. The method of claim 4, wherein the second score is further based on whether a requester associated with a scored request is a new requester.

6. The method of claim 4, wherein the second score is further based on a quantity of responses that have been received for a scored request.

7. The method of claim 1, further comprising:
   for the first pair of tags:
      determining a combination of other tag pairs that provide a sequence of tag pairs from the first tag to the second tag, the sequence being a shortest sequence to go from the first tag to the second tag through the other tag pairs;
      summing the first scores of the combination of other tag pairs to obtain a combined score;
      comparing the combined score to the first score of the first pair of tags; and
      when the combined score differs from the first score of the first pair of tags by a threshold amount, identifying at least one of the first tag or the second tag as fraudulent.

8. A computer product comprising a non-transitory computer readable medium tangibly storing a plurality of instructions for controlling a computer system, the instructions being to:
   at a computer server comprising at least one network interface for communications, a memory, and a processor coupled to the memory and to the at least one network interface:

receive from a plurality of requesting systems, a plurality of requests, each request of the plurality of requests requesting a location of a resource and including:
an image related to the resource,
information specifying how the image and the resource are related, and
metadata for the image;
for each of a plurality of responding systems, creating a queue that contains requests of the plurality of requests;
rank requests in each queue in accordance with criteria based on one or more of:
the responding system for which the queue was created,
the requesting system from which a request in the queue originated,
a length of time that a request has been in the queue, and
the resource for which the location is sought by a request in the queue;
send each queue to the responding system for which the queue was created, each queue specifying an order in which the requests are to be displayed at the responding system;
receive, from a first responding system of the plurality of responding systems, a first response to a first request of the plurality of requests, the first response including a first location of a first resource included in the first request;
receive a plurality of tags corresponding to the first resource, each tag being a keyword or keyphrase to be used for identifying requests associated with the keyword or keyphrase;
determine a number of times a first pair of tags of the plurality of tags appears in another request of the plurality of requests, the first pair of tags comprising a first tag and a second tag;
assign a first score to the first pair of tags, wherein the first score is based on the determined number of times the first pair of tags appears in another request; and
validate at least one of the first tag or the second tag based on the first score.

9. The computer product of claim 8, the instructions further including:
updating one or more of the queues created for the plurality of responding systems to include the first response.

10. The computer product of claim 8, the instructions further including:
receiving, from a first requesting system, a selection of the first response; and
updating one or more of the queues created for the plurality of responding systems to include the selection of the first response.

11. The computer product of claim 8, the instructions further including:
determining an age of each of the plurality of requests;
determining a second score for each of the plurality of requests based on the age of each request;
identifying, based on the determined second scores, a request of the plurality of requests for a response reminder; and
updating one or more of the queues created for the plurality of responding systems to include the response reminder for the identified request.

12. The computer product of claim 11, wherein the second score is further based on whether a requester associated with a scored request is a new requester.

13. The computer product of claim 11, wherein the second score is further based on a quantity of responses that have been received for a scored request having the second score.

14. The computer product of claim 8, the instructions further including:
for the first pair of tags:
determine a combination of other tag pairs that provide a sequence of tag pairs from the first tag to the second tag, the sequence being a shortest sequence to go from the first tag to the second tag through the other tag pairs;
sum the first scores of the combination of other tag pairs to obtain a combined score;
compare the combined score to the first score of the first pair of tags; and
when the combined score differs from the first score of the first pair of tags by a threshold amount, identify at least one of the first tag or the second tag as fraudulent.

15. A system for using images and image metadata to locate one or more resources, the system comprising:
a processor;
a memory, having instructions stored thereon, that, when executed by the processor, cause the processor to perform operations, the operations comprising:
receiving from a plurality of requesting systems, a plurality of requests, each request of the plurality of requests requesting a location of a resource and including:
an image related to the resource,
information specifying how the image and the resource are related, and
metadata for the image;
for each of a plurality of responding systems, creating a queue that contains requests of the plurality of requests;
ranking requests in each queue in accordance with criteria based on one or more of:
the responding system for which the queue was created,
the requesting system from which a request in the queue originated,
a length of time that a request has been in the queue, and
the resource for which the location is sought by a request in the queue;
sending each queue to the responding system for which the queue was created, each queue specifying an order in which the requests are to be displayed at the responding system;
receiving, from a first responding system of the plurality of responding systems, a first response to a first request of the plurality of requests, the first response including a first location of a first resource included in the first request;
receiving a plurality of tags corresponding to the first resource, each tag being a keyword or keyphrase to be used for identifying requests associated with the keyword or keyphrase;
determining a number of times a first pair of tags of the plurality of tags appears in another request of the plurality of requests, the first pair of tags comprising a first tag and a second tag;

assigning a first score to the first pair of tags, wherein the first score is based on the determined number of times the first pair of tags appears in another request; and validating at least one of the first tag or the second tag based on the first score.

16. The system of claim 15, further comprising:
updating one or more of the queues created for the plurality of responding systems to include the first response.

17. The system of claim 15, further comprising:
receiving, from a first requesting system, a selection of the first response; and
updating one or more of the queues created for the plurality of responding systems to include the selection of the first response.

18. The system of claim 15, further comprising:
determining an age of each of the plurality of requests;
determining a second score for each of the plurality of requests based on the age of each request;
identifying, based on the determined scores, a request of the plurality of requests for a response reminder; and
updating one or more of the queues created for the plurality of responding systems to include the response reminder for the identified request.

19. The system of claim 18, wherein the second score is further based on whether a requester associated with a scored request is a new requester.

20. The system of claim 15, further comprising:
for the first pair of tags:
determining a combination of other tag pairs that provide a sequence of tag pairs from the first tag to the second tag, the sequence being a shortest sequence to go from the first tag to the second tag through the other tag pairs;
summing the first scores of the combination of other tag pairs to obtain a combined score;
comparing the combined score to the first score of the first pair of tags; and
when the combined score differs from the first score of the first pair of tags by a threshold amount, identifying at least one of the first tag or the second tag as fraudulent.

* * * * *